(12) United States Patent
Lee et al.

(10) Patent No.: US 10,321,309 B2
(45) Date of Patent: *Jun. 11, 2019

(54) APPARATUSES AND METHODS FOR WIRELESS COMMUNICATION

(71) Applicant: QUALCOMM Incorporated, San Diego, CA (US)

(72) Inventors: Soo Bum Lee, San Diego, CA (US); Gavin Bernard Horn, La Jolla, CA (US); Anand Palanigounder, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/913,823

(22) Filed: Mar. 6, 2018

(65) Prior Publication Data

US 2018/0199193 A1    Jul. 12, 2018

Related U.S. Application Data

(63) Continuation of application No. 14/919,397, filed on Oct. 21, 2015, now Pat. No. 9,918,225.

(Continued)

(51) Int. Cl.
*H04W 12/04*     (2009.01)
*H04W 12/06*     (2009.01)

(52) U.S. Cl.
CPC ........... *H04W 12/04* (2013.01); *H04W 12/06* (2013.01); *H04L 2463/061* (2013.01)

(58) Field of Classification Search
CPC .............................. H04W 12/04; H04L 9/0844
See application file for complete search history.

(56) References Cited

U.S. PATENT DOCUMENTS

| 7,864,699 B2 | 1/2011 | Hu et al. |
| 8,880,683 B2 | 11/2014 | Chang et al. |

(Continued)

FOREIGN PATENT DOCUMENTS

| CN | 102238544 A | 11/2011 |
| WO | WO-2010025280 A2 | 3/2010 |

OTHER PUBLICATIONS

International Search Report and Written Opinion—PCT/US2015/057232—ISA/EPO—Jan. 26, 2016.

(Continued)

*Primary Examiner* — Kiet M Doan
(74) *Attorney, Agent, or Firm* — Liem T. Do

(57) ABSTRACT

One feature pertains to a method operational at a device. The method includes performing key agreement with a core network device, and generating an authentication session key based in part on a secret key shared with a home subscriber server (HSS), where the authentication session key is known to the core network device. The method further includes generating a mobility session key based in part on the authentication session key, where the mobility session key is known to a mobility management entity (MME) served by the core network device and serving the device. The method also includes cryptographically securing data sent from the device to a wireless communication network using the mobility session key.

22 Claims, 19 Drawing Sheets

Related U.S. Application Data

(60) Provisional application No. 62/074,513, filed on Nov. 3, 2014.

(56) References Cited

U.S. PATENT DOCUMENTS

| | | | |
|---|---|---|---|
| 8,964,647 | B2 | 2/2015 | Hu et al. |
| 2007/0186000 | A1 | 8/2007 | Nikander et al. |
| 2007/0249352 | A1 | 10/2007 | Song et al. |
| 2008/0101400 | A1 | 5/2008 | Auterinen |
| 2012/0155324 | A1* | 6/2012 | Janakiraman ........... H04L 41/12 370/254 |
| 2013/0290696 | A1 | 10/2013 | Broustis et al. |
| 2013/0331063 | A1* | 12/2013 | Cormier .............. H04L 63/0272 455/411 |
| 2014/0004824 | A1* | 1/2014 | Campagna ............ H04L 9/0866 455/411 |
| 2015/0244720 | A1 | 8/2015 | Suh |
| 2016/0006726 | A1* | 1/2016 | Mizikovsky .......... H04L 63/061 713/171 |
| 2016/0127896 | A1 | 5/2016 | Lee |

OTHER PUBLICATIONS

Kim H., et al., "Toward Efficient Mobile Authentication in Wireless Inter-Domain," in Proceedings of IEEE ASWN (Applications and Services in Wireless Networks), 2003, 10 pages.

Narayanan V., et al., "EAP-Based Keying for IP Mobility Protocols; draft-vidya-eap-usrk-ip-mobility-01.txt", Internet Engineering Task Force, IETF; Standard Working Draft, Internet Society (ISOC) 4, Rue Des Falaises CH—1205 Geneva, Switzerland, No. 1, Nov. 16, 2007 (Nov. 16, 2007), XP015060063, pp. 1-17.

* cited by examiner

APPARATUSES AND METHODS FOR WIRELESS COMMUNICATION

CLAIM OF PRIORITY

The present application for patent is a continuation application of U.S. patent application Ser. No. 14/919,397 entitled "APPARATUSES AND METHODS FOR WIRELESS COMMUNICATION" filed Oct. 21, 2015, which in turn claims priority to provisional application No. 62/074,513 entitled "Apparatus and Method Having an Improved Cellular Network Key Hierarchy" filed Nov. 3, 2014, the entire disclosures of which are hereby expressly incorporated by reference.

BACKGROUND

Field

The present disclosure relates generally to an improved key hierarchy for a cellular network.

Background

A current cellular network architecture 100, shown in FIG. 1, uses a mobility management entity (MME) 110 to implement procedures for controlling access to the cellular network by a user equipment (UE) 120. Typically, the MME 110 is owned and operated by a network service provider (system operator) as a core network 102 element, and is located in a secure location controlled by the network service provider. The core network 102 has a control plane including a Home Subscriber Server (HSS) 130 and the MME 110, and a user plane including a Packet Data Network (P-DN) Gateway (PGW) 140 and a Serving Gateway (S-GW) 150. The MME 110 is connected to radio access node 160 (e.g., an evolved Node B (eNB)). The RAN 160 provides radio interfaces (e.g., radio resource control (RRC) 180 and packet data convergence protocol (PDCP)/radio link control (RLC) 190) with the UE 120.

In future cellular network architectures it is envisioned that the MMEs 110 or network components that perform many of the functions of the MMEs 110 will be pushed out towards the network edge where they are less secure either because they are physically more accessible and/or are not isolated from other network operators. As network functions are moved to, for example, the cloud (e.g., internet), it may not be assumed that they are secure because they may have a lower level of physical isolation, or no physical isolation. Further, network equipment may not be owned by a single network service provider. As an example, multiple MME instances may be hosted within a single physical hardware device. As a result, the keys sent to the MMEs may need refreshing more frequently and hence it may not be advisable to forward the authentication vectors (AVs) to the MMEs.

There is a need for improved apparatuses and methods that provide additional security for the cellular network architectures of the future where MME functions are performed close to the network edge.

SUMMARY

One feature provides a method operational at a network device, the method comprising performing authentication and key agreement with a device, obtaining authentication information associated with the device, the authentication information including at least an authentication session key, generating a mobility session key based in part on the authentication session key, and transmitting the mobility session key to a mobility management entity (MME) serving the device. According to one aspect, the method further comprises generating different mobility session keys for different MMEs based on the authentication session key. According to another aspect, obtaining the authentication information includes determining that authentication information associated with the device is not stored at the network device, transmitting an authentication information request to a home subscriber server, and receiving the authentication information associated with the device from the home subscriber server in response to transmitting the authentication information request.

According to one aspect, obtaining the authentication information includes determining that authentication information associated with the device is stored at the network device, and retrieving the authentication information from a memory circuit at the network device. According to another aspect, the method further comprises receiving a key set identifier from the device, and determining that the authentication information associated with the device is stored at the network device based on the key set identifier received. According to yet another aspect, the method further comprises prior to performing authentication and key agreement with the device, receiving, from the MME, a non-access stratum (NAS) message originating from the device.

According to one aspect, the method further comprises generating the mobility session key based further in part on an MME identification value that identifies the MME. According to another aspect, the MME identification value is a globally unique MME identifier (GUMMEI). According to yet another aspect, the MME identification value is an MME group identifier (MMEGI).

According to one aspect, the method further comprises generating a different mobility management key for each MME serving the device, each of the different mobility management keys based in part on the authentication session key and a different MME identification value associated with each MME. According to another aspect, the method further comprises determining that, in connection to an MME relocation, a second MME is attempting to serve the device, generating a second mobility management key based in part on the authentication session key and an MME identification value associated with the second MME, and transmitting the second mobility management key to the second MME to facilitate MME relocation. According to yet another aspect, the method further comprises maintaining a counter value Key Count, and generating the mobility session key based further in part on a counter value Key Count. According to another aspect, generating the mobility session key includes deriving the mobility session key using a key derivation function having at least one of the authentication session key, an MME identification value uniquely identifying the MME, and/or a counter value Key Count as input(s).

Another feature provides a network device comprising a communication interface adapted to send and receive data, and a processing circuit communicatively coupled to the communication interface, the processing circuit adapted to perform authentication and key agreement with a device, obtain authentication information associated with the device, the authentication information including at least an authentication session key, generate a mobility session key based in part on the authentication session key, and transmit the mobility session key to a mobility management entity (MME) serving the device. According to one aspect, the processing circuit is further adapted to generate different mobility session keys for different MMEs based on the authentication session key. According to another aspect, the processing circuit adapted to obtain the authentication information includes determine that authentication information associated with the device is not stored at the network device, transmit an authentication information request to a home subscriber server, and receive the authentication information associated with the device from the home subscriber server in response to transmitting the authentication information request.

According to one aspect, the processing circuit is further adapted to generate the mobility session key based further in part on an MME identification value that identifies the MME. According to another aspect, the processing circuit is further adapted to prior to performing authentication and key agreement with the device, receiving, from the MME, a non-access stratum (NAS) message originating from the device. According to yet another aspect, the NAS message received includes a device identifier that identifies the device and an MME identification value that identifies the MME.

Another feature provides a network device comprising means for performing authentication and key agreement with a device, means for obtaining authentication information associated with the device, the authentication information including at least an authentication session key, means for generating a mobility session key based in part on the authentication session key, and means for transmitting the mobility session key to a mobility management entity (MME) serving the device. According to one aspect, the network device further comprises means for generating different mobility session keys for different MMEs based on the authentication session key.

Another feature provides a non-transitory computer-readable storage medium having instructions stored thereon that are operational at a network device, the instructions when executed by at least one processor causes the processor to perform authentication and key agreement with a device, obtain authentication information associated with the device, the authentication information including at least an authentication session key, generate a mobility session key based in part on the authentication session key, and transmit the mobility session key to a mobility management entity (MME) serving the device. According to one aspect, the instructions when executed by the processor further cause the processor to generate different mobility session keys for different MMEs based on the authentication session key.

Another feature provides a method operational at a network device, the method comprising receiving a non-access stratum (NAS) message from a device, forwarding the NAS message along with a network device identification value identifying the network device to a session key management entity (SKME) device, receiving a mobility session key from the SKME device, the mobility session key based in part on an authentication session key that was derived from a key shared between the device and a wireless communication network, and transmitting key derivation data to the device, the key derivation data enabling the device to derive the mobility session key. According to one aspect, the mobility session key received from the SKME device is further based in part on the network device identification value. According to another aspect, the network device identification value is a globally unique mobility management entity identifier (GUMMEI).

According to one aspect, the network device identification value is a mobility management entity group identifier (MMEGI). According to another aspect, the mobility session key received from the SKME device is further based in part on a counter value Key Count maintained at the SKME device. According to yet another aspect, the key derivation data is included in a NAS security mode command message transmitted to the device.

According to one aspect, the key derivation data includes the network device identification value. According to another aspect, the key derivation data includes a counter value Key Count maintained at the SKME device. According to yet another aspect, the method further comprises determining that a second network device needs to serve the device, determining that the second network device shares a common group identifier with the network device, and transmitting the mobility session key to the second network device. According to yet another aspect, the network device and the second network device are mobility management entities (MMEs) and the common group identifier is a common MME group identifier.

Another feature provides a network device comprising a communication interface adapted to send and receive data, and a processing circuit communicatively coupled to the communication interface, the processing circuit adapted to receive a non-access stratum (NAS) message from a device, forward the NAS message along with a network device identification value identifying the network device to a session key management entity (SKME) device, receive a mobility session key from the SKME device, the mobility session key based in part on an authentication session key that was derived from a key shared between the device and a wireless communication network, and transmit key derivation data to the device, the key derivation data enabling the device to derive the mobility session key. According to one aspect, the processing circuit is further adapted to determine that a second network device needs to serve the device, determine that the second network device shares a common group identifier with the network device, and transmit the mobility session key to the second network device.

Another feature provides a network device comprising means for receiving a non-access stratum (NAS) message from a device, means for forwarding the NAS message along with a network device identification value identifying the network device to a session key management entity (SKME) device, means for receiving a mobility session key from the SKME device, the mobility session key based in part on an authentication session key that was derived from a key shared between the device and a wireless communication network, and means for transmitting key derivation data to the device, the key derivation data enabling the device to derive the mobility session key. According to one aspect, the network device further comprises means for determining that a second network device needs to serve the device, means for determining that the second network device shares a common group identifier with the network device, and means for transmitting the mobility session key to the second network device.

Another feature provides a non-transitory computer-readable storage medium having instructions stored thereon that are operational at a network device, the instructions when executed by at least one processor causes the processor to receive a non-access stratum (NAS) message from a device, forward the NAS message along with a network device identification value identifying the network device to a session key management entity (SKME) device, receive a mobility session key from the SKME device, the mobility session key based in part on an authentication session key that was derived from a key shared between the device and a wireless communication network, and transmit key derivation data to the device, the key derivation data enabling the device to derive the mobility session key. According to one aspect, the instructions when executed by the processor further cause the processor to determine that a second network device needs to serve the device, determine that the second network device shares a common group identifier with the network device, and transmit the mobility session key to the second network device.

Another feature provides a method operational at a device, the method comprising performing authentication and key agreement with a session key management entity (SKME) device, generating an authentication session key based in part on a secret key shared with a home subscriber server (HSS), the authentication session key known to the SKME device, generating a mobility session key based in part on the authentication session key, the mobility session key known to a mobility management entity (MME) serving the device, and cryptographically securing data sent from the device to a wireless communication network using the mobility session key. According to one aspect, the method further comprises generating different mobility session keys for different MMEs based on the authentication session key. According to another aspect, the method further comprises receiving key derivation data from the MME after successfully authenticated with the SKME device, the key derivation data enabling the device to derive the mobility session key.

According to one aspect, the key derivation data includes an MME identification value identifying the MME serving the device, and the method further comprises generating the mobility session key based further in part on the MME identification value. According to another aspect, the key derivation data includes a counter value Key Count maintained at the SKME device. According to yet another aspect, the key derivation data is included in a security mode command message received from the MME.

According to one aspect, generating the mobility session key includes deriving the mobility session key using a key derivation function having at least one of the authentication session key, an MME identification value uniquely identifying the MME, and/or a counter value Key Count as input(s). According to another aspect, the method further comprises receiving notification of MME relocation including an MME identifier uniquely identifying a second MME attempting to serve the device, generating a second mobility session key based in part on the authentication session key and the MME identifier uniquely identifying the second MME. According to yet another aspect, the method further comprises deriving a node B key $K_{eNB}$ based in part on the mobility session key, and encrypting data transmitted to a radio access node serving the device using the node B key $K_{eNB}$.

Another feature provides a device comprising a wireless communication interface adapted to send and receive data to and from a wireless communication network, and a processing circuit communicatively coupled to the wireless communication interface, the processing circuit adapted to perform authentication and key agreement with a session key management entity (SKME) device, generate an authentication session key based in part on a secret key shared with a home subscriber server (HSS), the authentication session key known to the SKME device, generate a mobility session key based in part on the authentication session key, the mobility session key known to a mobility management entity (MME) serving the device, and cryptographically secure data sent from the device to the wireless communication network using the mobility session key. According to one aspect, the processing circuit is further adapted to generate different mobility session keys for different MMEs based on the authentication session key. According to another aspect, the processing circuit is further adapted to receive key derivation data from the MME after successfully authenticated with the SKME device, the key derivation data enabling the device to derive the mobility session key. According to yet another aspect, the key derivation data includes an MME identification value identifying the MME serving the device, and the processing circuit is further adapted to generate the mobility session key based further in part on the MME identification value.

According to one aspect, generating the mobility session key includes deriving the mobility session key using a key derivation function having at least one of the authentication session key, an MME identification value uniquely identifying the MME, and/or a counter value Key Count as input(s). According to another aspect, the processing circuit is further adapted to receive notification of MME relocation including an MME identifier uniquely identifying a second MME attempting to serve the device, generate a second mobility session key based in part on the authentication session key and the MME identifier uniquely identifying the second MME.

Another feature provides a device comprising means for performing authentication and key agreement with a session key management entity (SKME) device, means for generating an authentication session key based in part on a secret key shared with a home subscriber server (HSS), the authentication session key known to the SKME device, means for generating a mobility management key based in part on the authentication key, the mobility management key known to a mobility management entity (MME) serving the device, and means for cryptographically securing data sent from the device to a wireless communication network using the mobility session key. According to one aspect, the device further comprises means for generating different mobility session keys for different MMEs based on the authentication session key.

Another feature provides a non-transitory computer-readable storage medium having instructions stored thereon that are operational at a device, the instructions when executed by at least one processor causes the processor to perform authentication and key agreement with a session key management entity (SKME) device, generate an authentication session key based in part on a secret key shared with a home subscriber server (HSS), the authentication session key known to the SKME device, generate a mobility session key based in part on the authentication session key, the mobility session key known to a mobility management entity (MME) serving the device, and cryptographically securing data sent from the device to a wireless communication network using the mobility session key. According to one aspect, the instructions when executed by the processor further causes the processor to generate different mobility session keys for different MMEs based on the authentication session key.

DETAILED DESCRIPTION

The word "exemplary" is used herein to mean "serving as an example, instance, or illustration." Any embodiment described herein as "exemplary" is not necessarily to be construed as preferred or advantageous over other embodiments.

Figure 1:
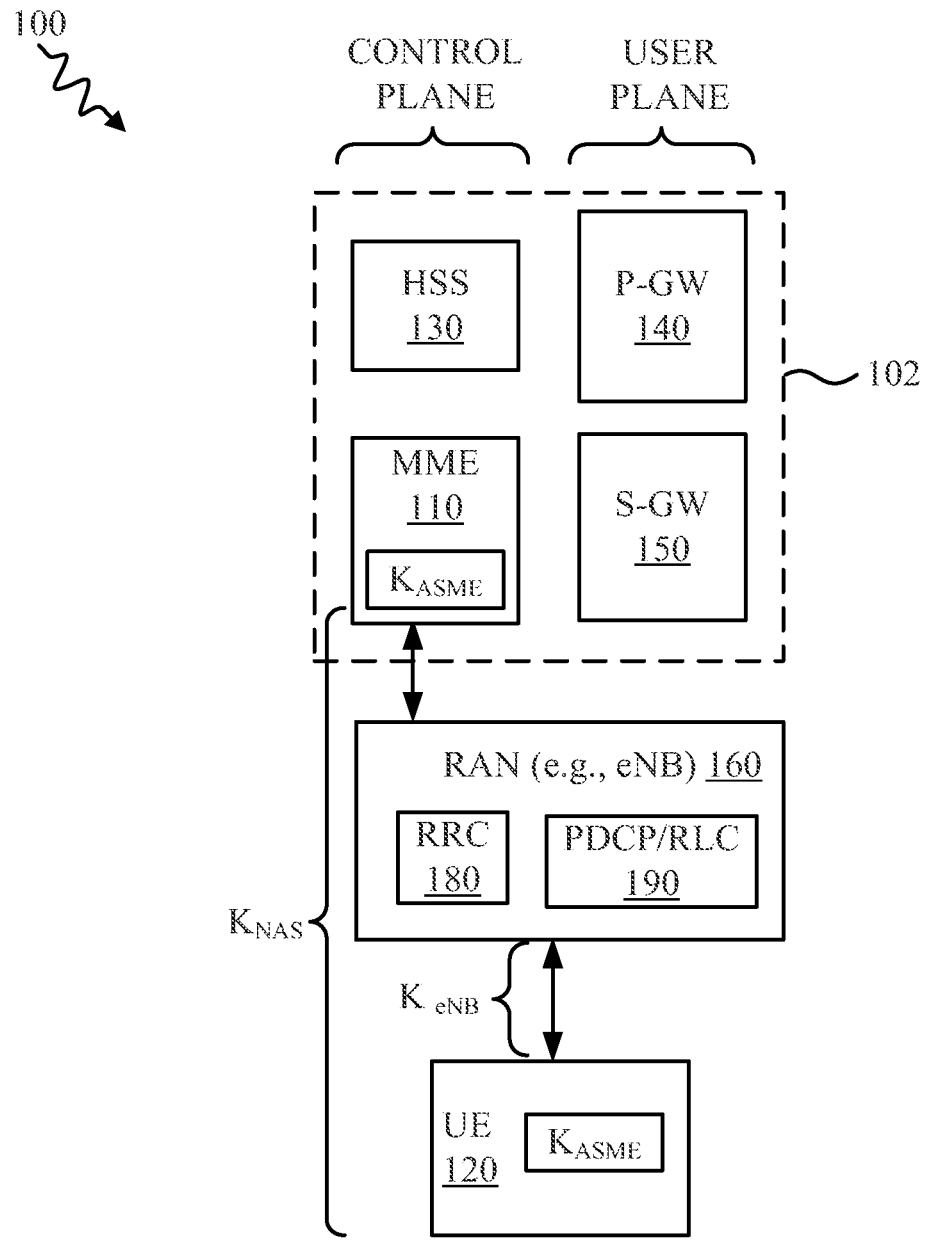
FIG. 1 is a block diagram of an example of a wireless communication system found in the prior art.
Figure 2:
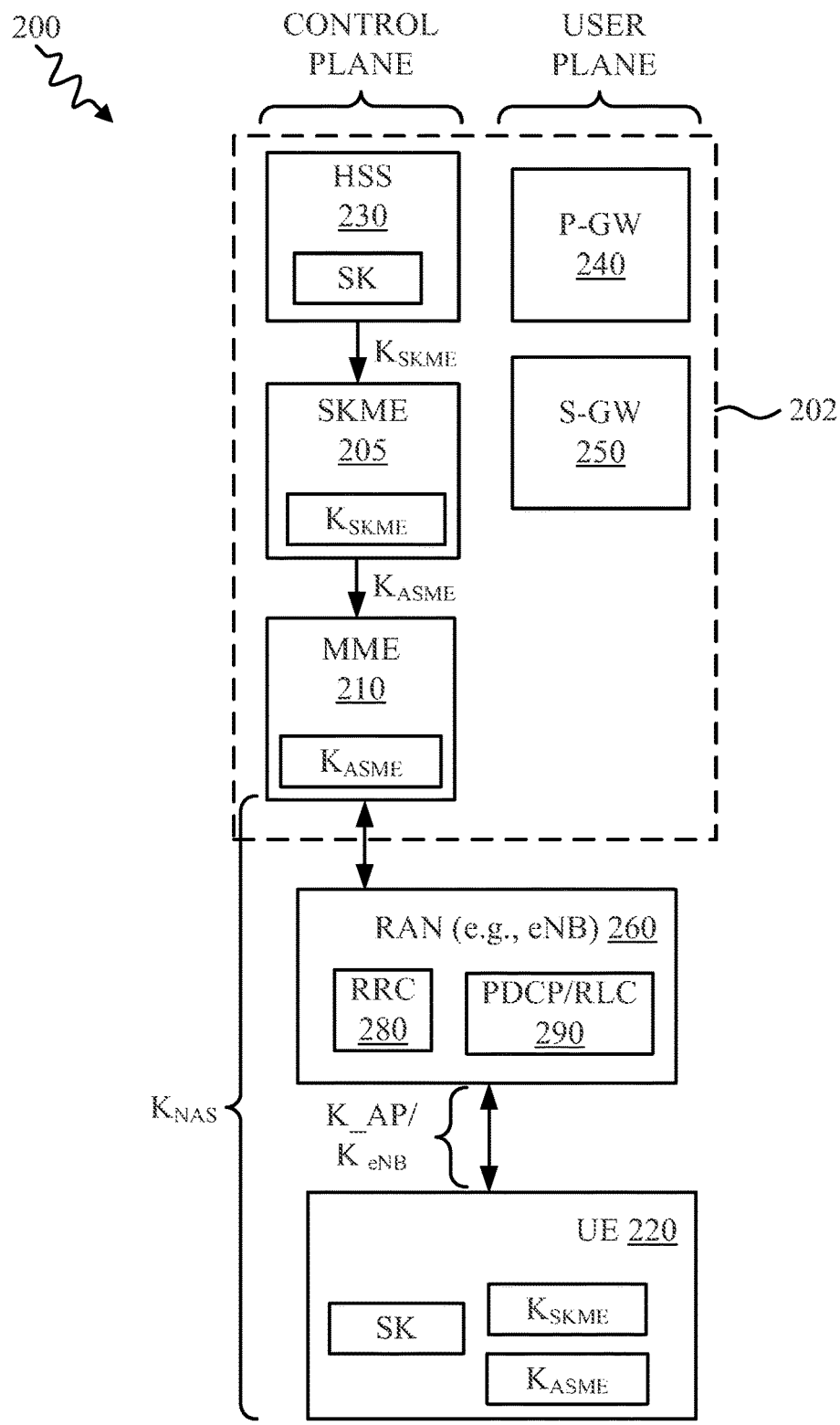
FIG. 2 illustrates a wireless communication network.

FIG. 2 illustrates a wireless communication network 200 according to one aspect of the disclosure. The wireless communication network 200 includes a core network 202, a radio access node (e.g., eNB) 260, and a wireless communication device (e.g., UE) 220. The core network includes, among other things, a session key management entity (SKME) device 205 (may herein be referred to as "authentication session key anchor function device" or "core network device"), an MME 210, an HSS 230, a P-GW 240, and an S-GW 250. The SKME device 205, the MME 210, and the HSS 230 comprise the control plane, while the P-GW 240 and the S-GW 250 comprise the user plane. This architecture of the wireless communication network 200 may be used in a fifth generation (5G) cellular network.

The radio access node 260 may be, for example, an evolved node B (eNB) and may communicate with the MME 210 and the UE 220. The RAN 260 provides radio interfaces (e.g., radio resource control (RRC) 280 and packet data convergence protocol (PDCP)/radio link control (RLC) 290) with the UE 220.

The SKME 205 may be a trust anchor or key anchor located deep inside the wireless communication network 200. The SKME 205 derives mobility session keys (e.g., key $K_{ASME}$) for each MME 210 it serves. (Although FIG. 2 illustrates only one (1) MME 210, the SKME 205 may be in communication with and/or serve a plurality of MMEs.) Thus, as MMEs 210 and/or network devices that perform the MMEs' functions are pushed to the network's edge (i.e., close to RAN or collocated with the RAN), the SKME 205 stays deep inside the network 200 where physical access from external entities is prohibited. In this fashion the SKME 205 acts as an intermediary between the MME 210 and the HSS 230.

The HSS 230 generates an authentication session key (e.g., key $K_{SKME}$) based on one or more shared keys (SK) shared between the UE 220 and the wireless communication network's authentication center (AuC) (not shown in FIG. 2). The one or more shared keys may be, for example, a root key and/or a cipher key (CK) and an integrity key (IK) derived from the root key.

Figure 3A:
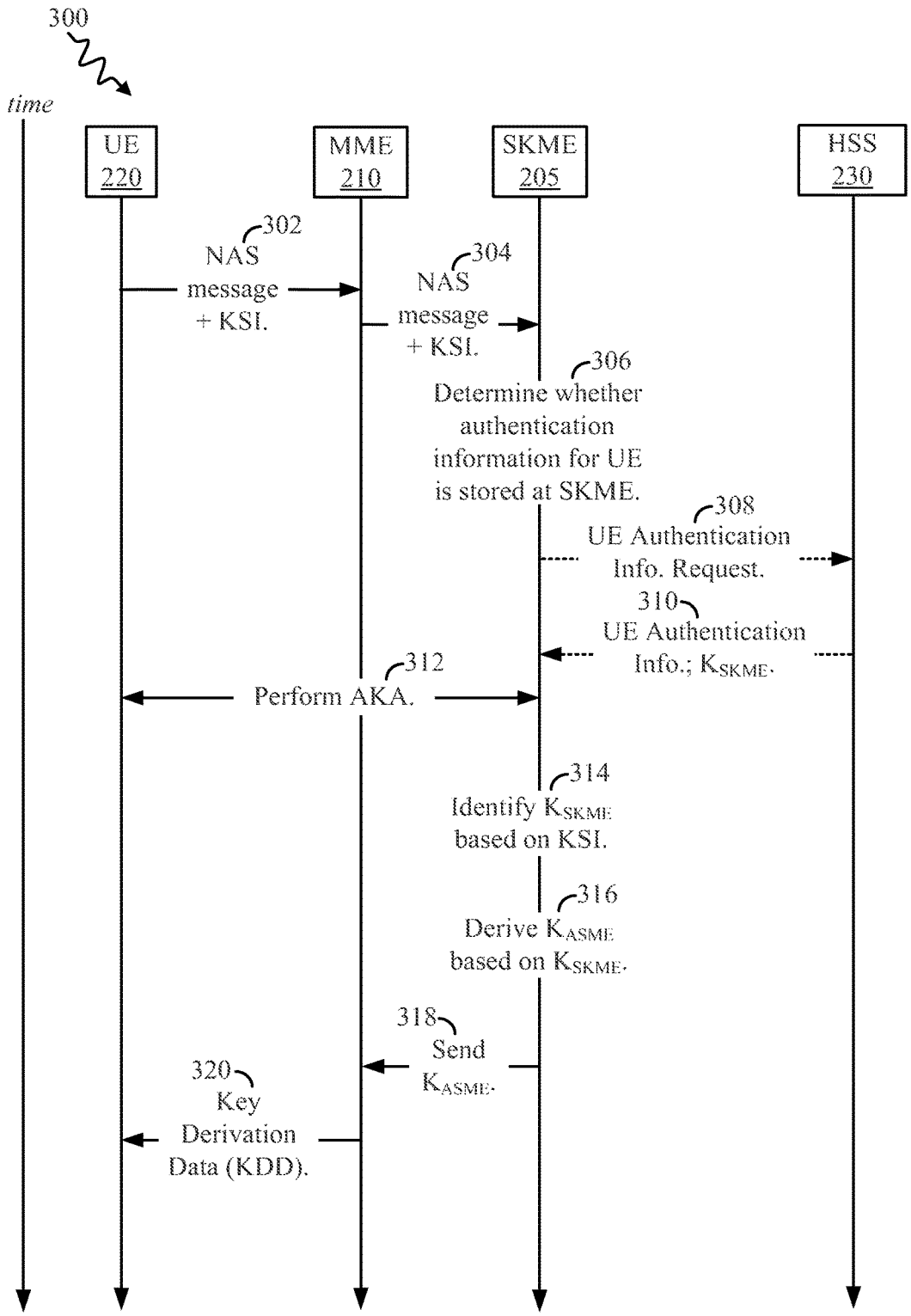
FIGS. 3A and 3B illustrate a process flow diagram operational at a wireless communication network.
Figure 3B:
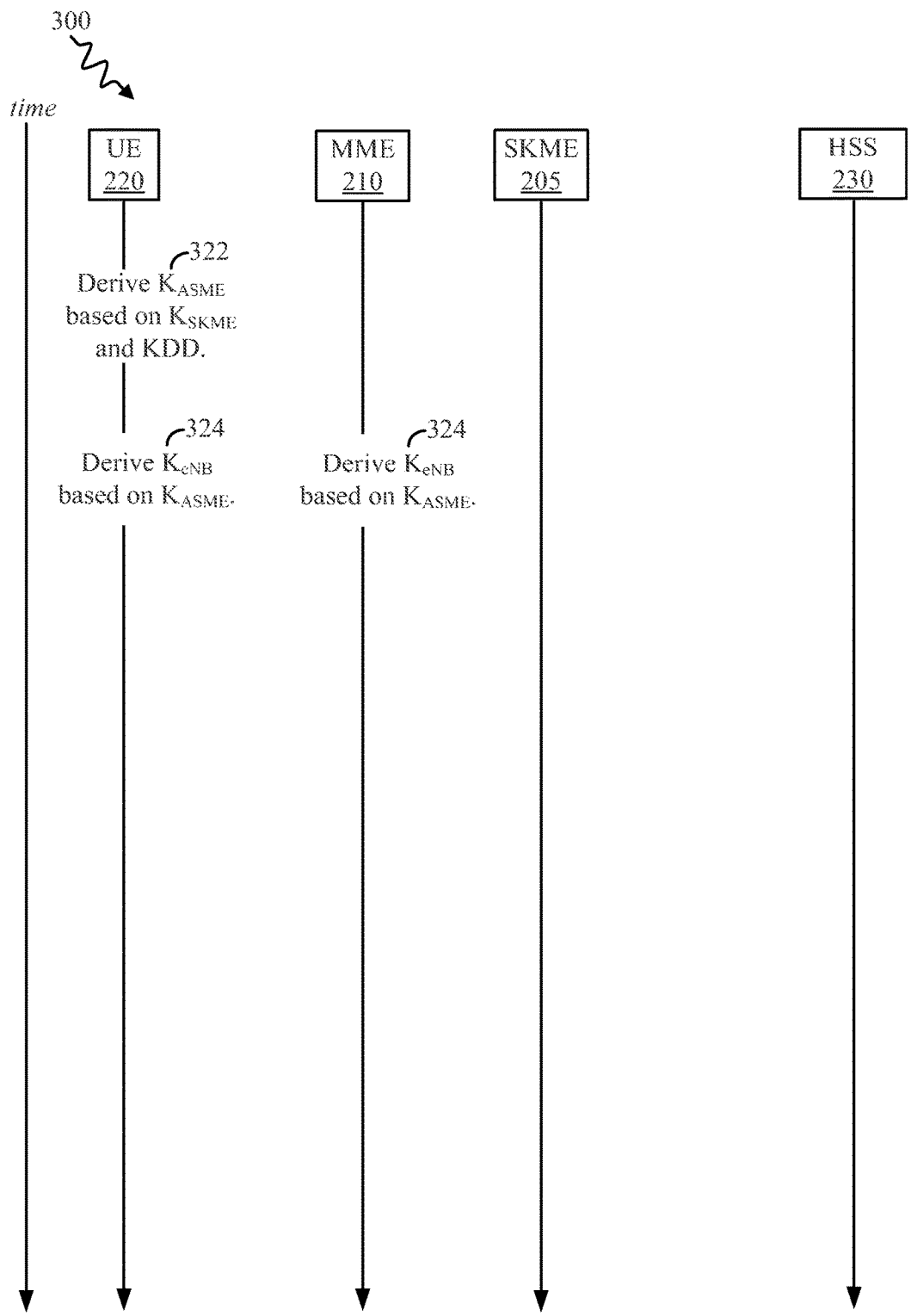

FIGS. 3A and 3B illustrate a process flow diagram 300 of the wireless communication network 200 according to one aspect of the disclosure. Some components (e.g., RAN 260, P-GW 240, S-GW 250) of the network 200 have been omitted from FIG. 3 for clarity.

Referring to FIG. 3A, the process may begin with a UE 220 transmitting 302 a non-access stratum (NAS) message to an MME 210 (e.g., via a RAN 260 not shown in FIG. 3A). Among other things, the NAS message may be, for example, an attach request, a subsequent service request, or a tracking area update request. In some cases the NAS message may include a key set identifier (KSI) associated with the UE 220 and/or a device identifier (e.g., international mobile subscriber identity (IMSI)) that identifies the UE 220. The MME 210 may then forward 304 the NAS message and the KSI (if included) to the SKME 205. The SKME 205 may next determine 306 whether authentication information for the UE 220 is already stored at the SKME 205. If it is, then the SKME 205 uses the stored authentication information (e.g., authentication vector) for the UE 220 to perform 312 authentication and key agreement (AKA) with the UE 220. If it is not, the SKME 205 may transmit 308 an authentication information request to an HSS 230 requesting authentication information associated with the UE 220. In response, the HSS 230 may provide 310 one or more authentication vectors (e.g., authentication information) to the SKME 205. At least one of the authentication vectors provided is associated with the UE 220 and can be used to perform 312 AKA with the UE 200. An authentication vector may include an expected response (XRES), an authentication value (AUTN), a random number (RAND), and an authentication session key $K_{SKME}$ may be referred to herein as "first authentication session key $K_{SKME}$", "second authentication session key $K_{SKME}$", etc.). The AUTN may be based on a sequence number and a secret key which the UE 220 shares with the HSS 230.

The authentication session key $K_{SKME}$ may be generated at the HSS based in part on one or more shared keys (SK) shared between the UE and the AuC of the network. These shared keys may include the root key and/or a cipher key (CK) and an integrity key (IK) derived from the root key. To further perform AKA, the SKME 205 may transmit an authentication request message (e.g., includes AUTN and RAND) to the UE 220 requesting an authentication response (RES). The SKME 205 may then compare RES to XRES for a match to determine whether authentication with the UE 220 was successful.

After successful completion of AKA 312, the SKME 205 may identify 314 the appropriate authentication session key $K_{SKME}$ for the UE 220 based on the KSI (if any) provided by the UE 220. This may be done if the SKME 205 receives a plurality of authentication vectors having a plurality authentication session keys $K_{SKME}$ from the HSS 230. The SKME 205 may then derive/generate 316 a mobility management key $K_{ASME}$ (e.g., "first mobility management key $K_{ASME}$", "second mobility management key $K_{ASME}$", "third mobility management key $K_{ASME}$", etc.). The mobility management key $K_{ASME}$ may be based on the authentication session key $K_{SKME}$, an MME identification value (e.g., globally unique MME identifier (GUMMEI), MME identifier (MMEI), MME group identifier (MMEGI), public land mobile network identifier (PLMN ID), MME code (MMEC), etc.), and/or a counter value (e.g., Key Count). Thus, $K_{ASME}$ may be derived as $K_{ASME}$=KDF($K_{SKME}$, MME identification value|Key Count) where KDF is a key derivation function. The counter value Key Count is a counter value that may be incremented by the SKME 205 to enable the SKME 205 to derive a fresh $K_{ASME}$ key for the same MME 210 whenever relocation back to the MME 210 occurs. According to one aspect, a number used once (nonce) may be used instead of the counter value Key Count. According to another aspect, the MME identification value (e.g., GUMMEI, MMEGI, MMEI, MMEC, PLMN ID, etc.) may be omitted if it's not used to authorize a particular MME identity. For example, if SKME 205 is always in the same network as the MMEs 210 it provides $K_{ASME}$ to, then including the MME identification value in the key derivation may be unnecessary. Thus, according to another example, $K_{ASME}$ may be derived as $K_{ASME}$=KDF($K_{SKME}$, nonce) or $K_{ASME}$=KDF($K_{SKME}$, Key Count). The MME identification value may be one example of a network device identification value.

Next, the SKME 205 may send 318 the mobility session key $K_{ASME}$ to the MME 210 that it was generated for. The MME 210 may send 320 key derivation data (KDD) to the UE 220 to help the UE 220 generate the mobility session key $K_{ASME}$. According to one example, the key derivation data may be included in a non-access stratum (NAS) security mode command (SMC). The key derivation data may include the MME identification value (e.g., GUMMEI, MMEGI, MMEI, MMEC, PLMN ID, etc.), the counter value Key Count, and/or a nonce that were used to generate the key $K_{ASME}$. With this data, the UE 220 can then generate/derive 322 the key $K_{ASME}$ and use it to secure communication, such as data traffic, between itself and the wireless communication network/serving network (e.g., MME 210, SKME 205, etc.). The MME 210 and the UE 220 may also generate/derive 324 subsequent keys (e.g., $K_{eNB}$, $K_{NASenc}$, $K_{NASint}$, NK, etc.) based on the mobility management key $K_{ASME}$ and use them to secure communications between the UE 220, MME 210, and/or the RAN (e.g., eNB) 260 serving the UE 220.

According to one aspect, the authentication session key $K_{SKME}$ may be derived using a first key derivation function having a secret key (e.g., CK, IK, etc.) and a serving network identity (SN_id) as inputs. The mobility session key $K_{ASME}$ may be derived using a second key derivation function. The first and second key derivation functions may be based on, for example, key-hashed message authentication code (HMAC) HMAC-256, HMAC-SHA-256, HMAC-SHA-3, etc. The authentication and key agreement may be performed using an extensible authentication protocol (EAP), or specific NAS signaling. The mobility session key $K_{ASME}$ may be derived during the AKA procedure (for the currently attached MME with the UE), or during a handover involving an MME relocation. The session may be defined for the currently attached MME by the SKME 205. MME relocation may be performed within a group of MMEs sharing an MMEGI. Alternatively, MME relocation may be performed with another MME having a different MMEGI. According to one aspect, the GUMMEI may be based on a combination of an MMEGI and an MME code.

According to one aspect of the disclosure, the MME may receive the mobility session key $K_{ASME}$ from the SKME 300 over a communication channel that is security protected.

According to another aspect, a target MME during an MME relocation may receive the key $K_{ASME}$ used by another MME if the two MMEs belong to the same MME group (e.g., both have the same MME group identifier (MMEGI)).

Figure 4:
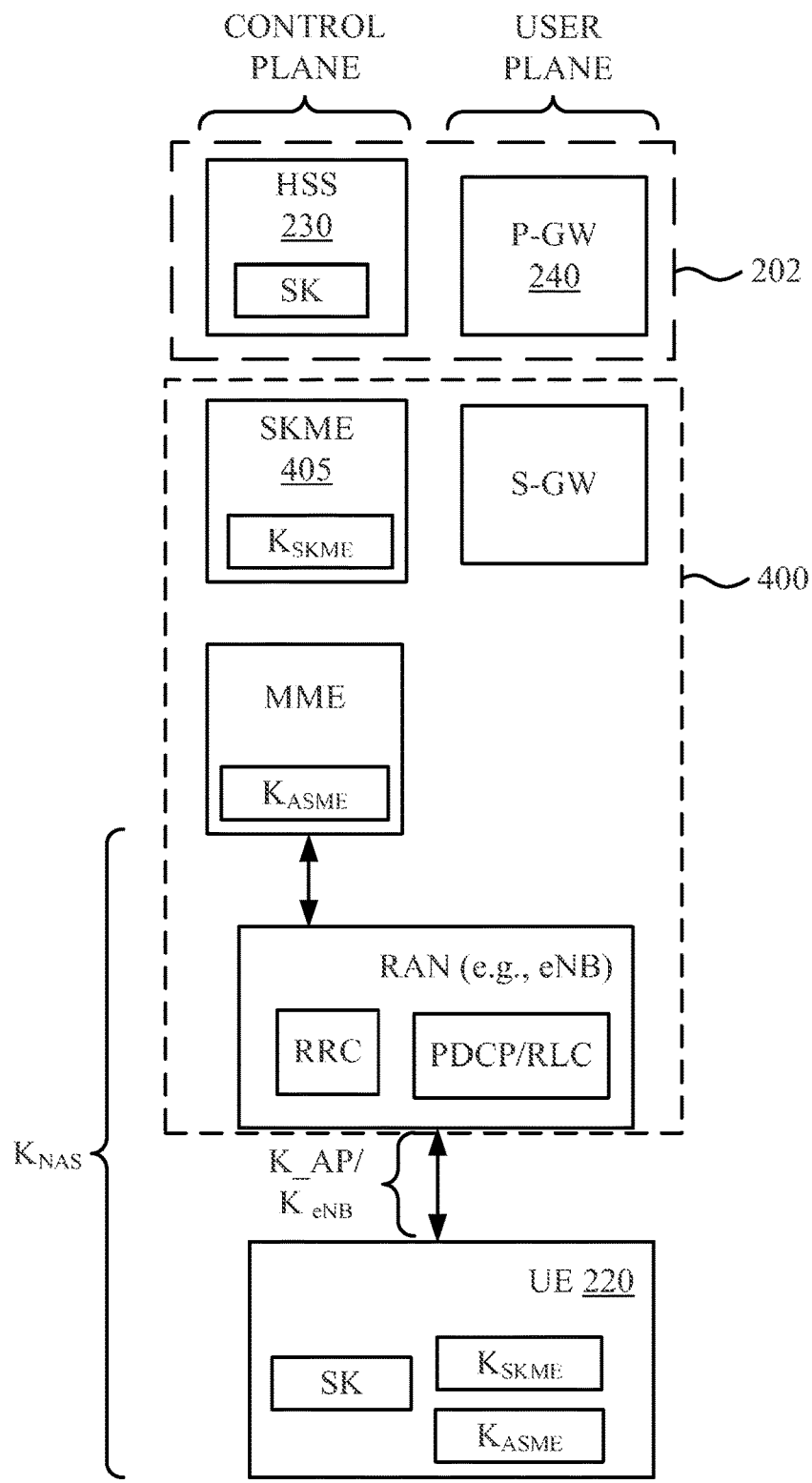
FIGS. 4 and 5 illustrate scenarios where a user equipment is roaming and is thus in a visited network outside of the home network.
Figure 5:
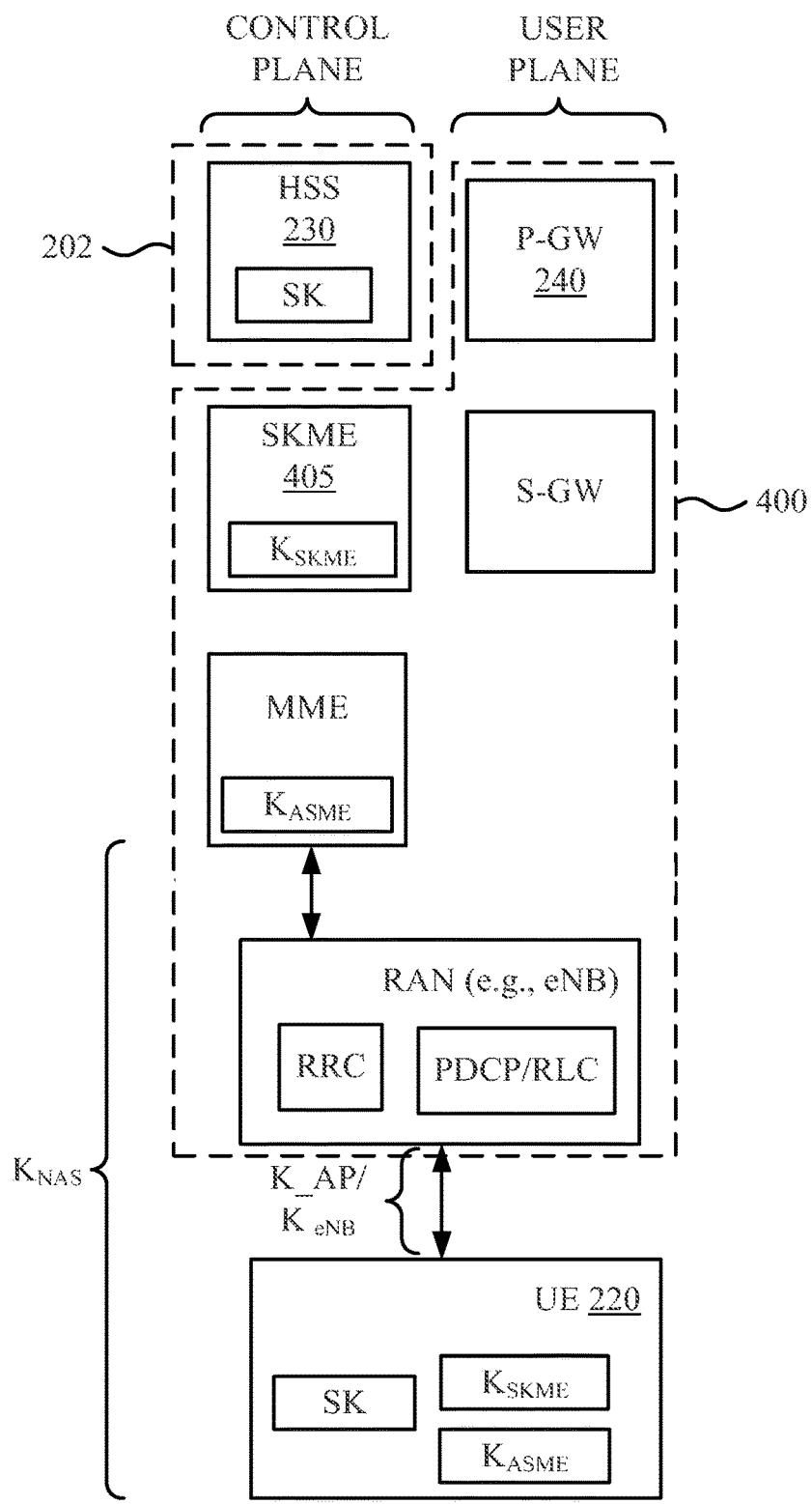

FIGS. 4 and 5 illustrate scenarios where the UE 220 shown in FIG. 2 is roaming and is thus in a visited network 400 outside of the home network 202. In such a case, the SKME 405 of the visited network becomes the local key anchor and also performs mutual authentication (e.g., AKA) with the UE 220, and generally follows the process described above with respect to FIG. 3. Similarly, during an MME relocation (e.g., handover or tracking area update) within the visited network, the local SKME 405 of the visited network 400 derives a new $K_{ASME}$ and provides it to the target/new MME. The key $K_{eNB}$ may be derived from the new $K_{ASME}$. In FIGS. 2, 4, and 5, the key $K_{NAS}$ is used to secure control messages between the UE 220 and the MME 210.

Figure 6:
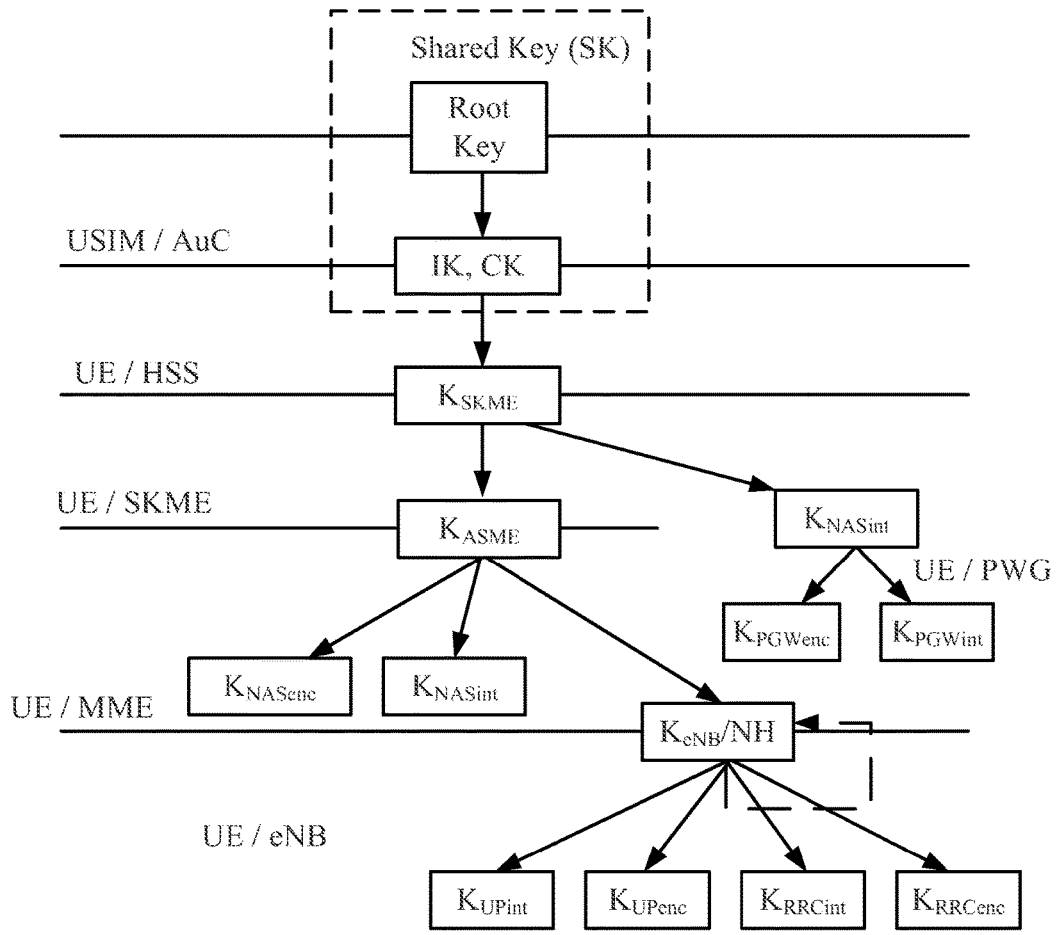
FIG. 6 illustrates a schematic diagram of the key hierarchy for the wireless communication network.

FIG. 6 illustrates a schematic diagram of the key hierarchy for the wireless communication network 200 described above. The UE's universal subscriber identity module (USIM) and the network's authentication center (AuC) may store a root key. From the root key, an integrity key (IK) and a cipher key (CK) may be derived and provided to the HSS. The root key, CK, and IK may be considered shared secret keys shared between the UE and the network.

The HSS may in turn generate the authentication session key $K_{SKME}$ and provide it to the SKME. The session key $K_{SKME}$ is valid during the entire authentication session. The SKME may utilize the $K_{SKME}$ to generate the mobility session key $K_{ASME}$ and provide that key to the MME serving the UE. In one aspect, the mobility session key $K_{ASME}$ may be valid for only a specific MME. In other aspects, the mobility session key $K_{ASME}$ may be shared between MMEs of the same group (e.g., having the same MMEGI). The MME serving the UE may in turn generate other keys ($K_{NASenc}$, $K_{NASint}$, $K_{eNB}$/NH, etc.) based on the $K_{ASME}$.

Attach, Handover, and Tracking Area Update (TAU) Processes

During an initial attach to a network, a UE performs an authentication and key agreement (AKA) procedure with a session key management entity (SKME) device. Once authentication is successful, SKME derives a key (e.g., $K_{ASME}$) for the MME to which the UE is attached and provides the key to the MME.

When a tracking area update (TAU) involving MME relocation is requested by a UE, the new MME that receives the TAU request receives a new key $K_{ASME}$ from the SKME and establishes a security association with the UE by performing a NAS SMC procedure. Similarly, when a handover involving MME relocation happens, the target MME also gets a new key $K_{ASME}$ from the SKME and establishes a security association with the UE.

An MME that supports two tracking areas may initiate a change of mobility session key $K_{ASME}$ when the UE moves between tracking areas. This hides the network configuration from the UE. For example, the UEs may only see tracking areas and not MMEs. This may happen both in response to a TAU or a handover that changes tracking areas.

Figure 7:
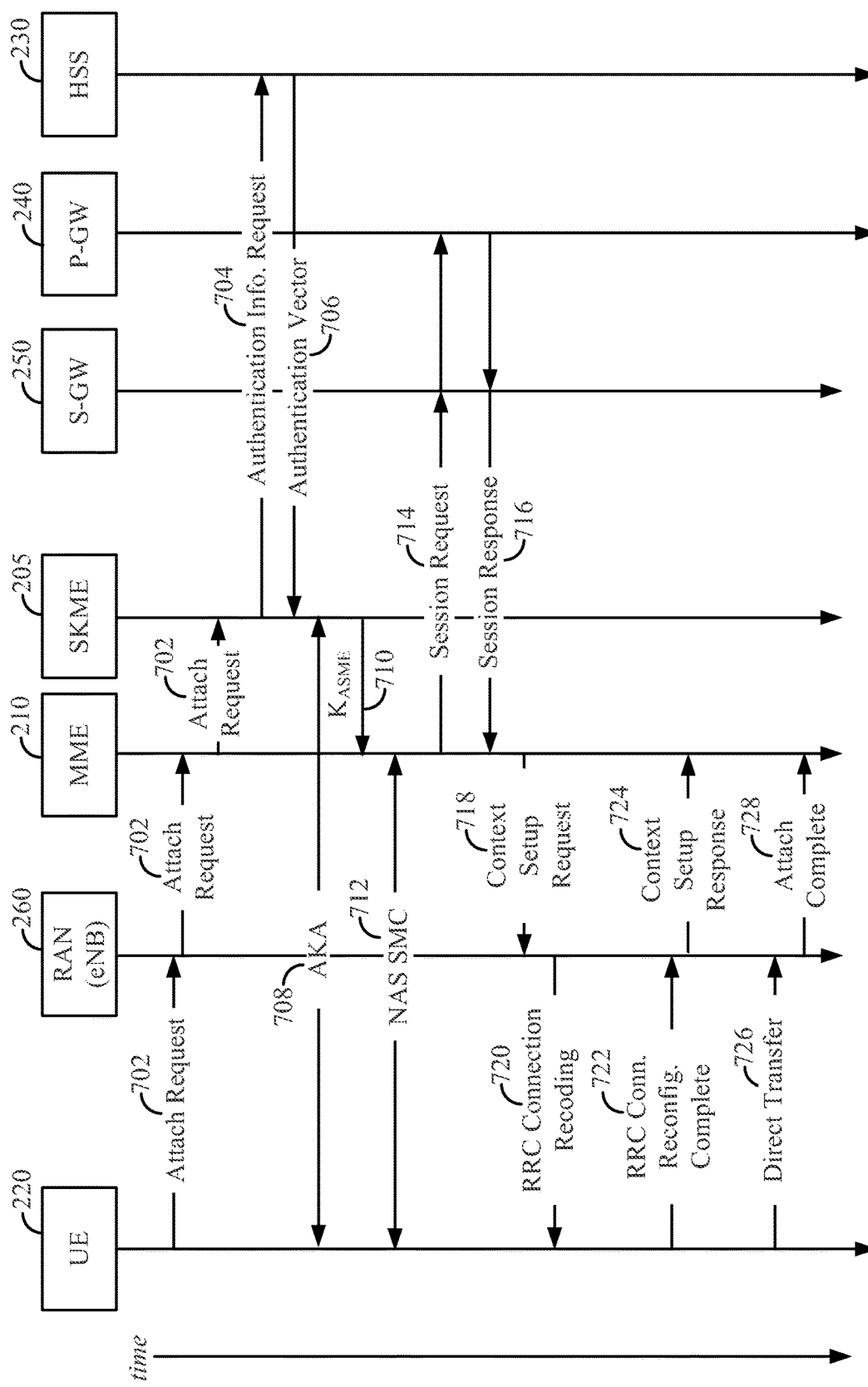
FIG. 7 illustrates a flow diagram of an attach procedure and initial data transfer for a UE connecting to a wireless communication network.

FIG. 7 illustrates a flow diagram of an attach procedure and initial data transfer for a UE connecting to a wireless communication network (e.g., wireless cellular network) according to one aspect of the disclosure. First, the UE 220 transmits an attach request 702 to a RAN 260, which in turn forwards the request to the MME 210, which in turn forwards the request (along with possibly KSI information) to the SKME 205. The SKME 205 may then transmit an authentication information request 704 to the HSS 230 and in response it receives one or more authentication vectors 706 from the HSS 230 that may include an expected response (XRES), an authentication value (AUTN), a random number (RAND), and an authentication session key $K_{SKME}$. The AUTN may be based on a sequence number and a secret key which the UE 220 shares with the HSS 230.

Once the SKME 205 has the authentication vector associated with the UE 220, the UE 220 and the SKME 205 may perform 708 AKA. Once AKA is successful, the SKME 205 may derive a mobility session key $K_{ASME}$ based on the authentication session key $K_{SKME}$, an MME identification value (e.g., GUMMEI, MMEI, MMEGI, etc.), and/or a counter value (e.g., Key Count). Thus, $K_{ASME}$ may be derived as $K_{ASME}$=KDF($K_{SKME}$, MME identification value|Key Count) where KDF is a key derivation function. The counter value Key Count is a counter value that may be incremented by the SKME 205 to enable the SKME 205 to derive a fresh $K_{ASME}$ key for the same MME 210 whenever handover back to the MME 210 occurs. According to one aspect, a number used once (nonce) may be used instead of the counter value. According to another aspect, the GUMMEI may be omitted if it's not used to authorize a particular MME identity. For example, if the SKME 205 is always in the same network as the MMEs it provides K-$_{ASME}$ for, then including GUMMEI in the key derivation may be unnecessary. Thus, according to another example, $K_{ASME}$ may be derived as $K_{ASME}$=KDF($K_{SKME}$, nonce). The mobility session key $K_{ASME}$ is then sent 710 to the MME 210. The MME 210 may then use the mobility session key $K_{ASME}$ to perform 712 a NAS SMC procedure with the UE 220. During the NAS SMC procedure, the MME 210 may provide its GUMMEI and/or the Key Count to the UE 220 so the UE 220 can also derive $K_{ASME}$. The remaining steps 714-728 shown in FIG. 7 may be similar to those found in 4G LTE cellular communication protocols.

Figure 8:
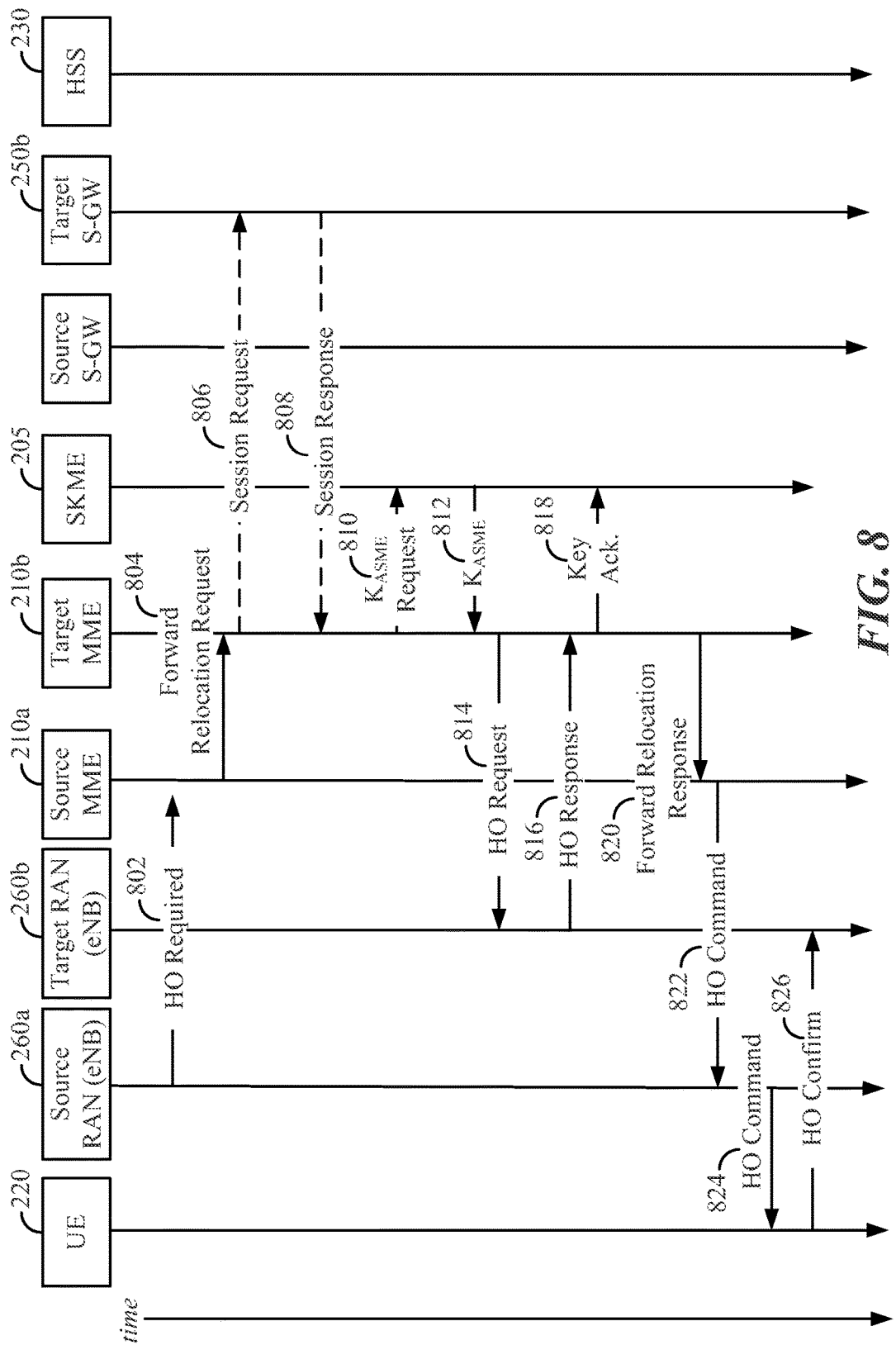
FIG. 8 illustrates a flow diagram of an S1-handover procedure.

FIG. 8 illustrates a flow diagram of an S1-handover procedure according to one aspect of the disclosure. First, the source eNB 260a (i.e., the current eNB) transmits a handover (HO) required message 802 to the source MME 210a (i.e., the current MME). Next, the source MME 210a transmits/forwards a relocation request 804 based on the HO required message to the target MME 210b (i.e., the new MME). The target MME 210b may create and transmit a session request 806 to a target serving gateway (S-GW) 250b and receive a session response 808 from the target S-GW 250b. The target MME 210b may also transmit a key request 810 for a mobility session key $K_{ASME}$ to the SKME 205. In so doing, the target MME 210b may provide the SKME 205 with its MME identification value (e.g., GUMMEI). The SKME 205 may in turn generate the mobility session key $K_{ASME}$ using the MME's GUMMEI, the authentication session key $K_{SKME}$ it previously received from the HSS 230 (described above), and the Key Count. According to one aspect, a number used once (nonce) may be used instead of the Key Count. According to another aspect, the GUMMEI may be omitted if it is not desired to authorize a particular MME identity. The SKME 205 transmits the $K_{ASME}$ 812 to the target MME 210b. According to one aspect, the target MME 210b may transmit the session request 806 to the target S-GW 250b and transmit the key request 810 at about the same time. Thus, steps 806 and 810 may be carried out concurrently with steps 808 and 812.

The target MME 210b may then transmit a handover request 814 to the target eNB 260b (i.e., the potential new eNB) and in response the target eNB 260b sends back a handover response 816. The handover request 814 may include the key $K_{eNB}$ derived by the target MME 210b using $K_{ASME}$. The handover response 816 indicates whether the target eNB 260b agrees to accept the handover. If the target eNB 260b does agree to accept the handover then the target MME 210b sends a key (i.e., $K_{ASME}$) acknowledgement message 818 to the SKME 205. Upon receiving the key acknowledgement message, the SKME 205 may then increment the Key Count counter value. The step of sending the key acknowledgement message 818 is delayed until the handover request acknowledgement 816 is received because the handover request may be rejected by the target eNB 260b. In such case, a new $K_{ASME}$ doesn't need to be derived by the UE 220, and in the case SKME 205 may not need to increase the Key Count. After the target MME 210b sends the source MME 210a the relocation response 820, the source MME 210a sends a handover command 822 to the source eNB 260a which is forwarded 824 to the UE 220. The handover command 822, 824 may include the GUMMEI of the target MME 210b and the Key Count so that the UE 220 can derive the new $K_{ASME}$ and the new $K_{eNB}$ for the target eNB 260b. The UE 220 responds with a handover confirmation message 826 to the target eNB 260b. The handover confirmation message 826 may be integrity protected and ciphered.

Figure 9A:
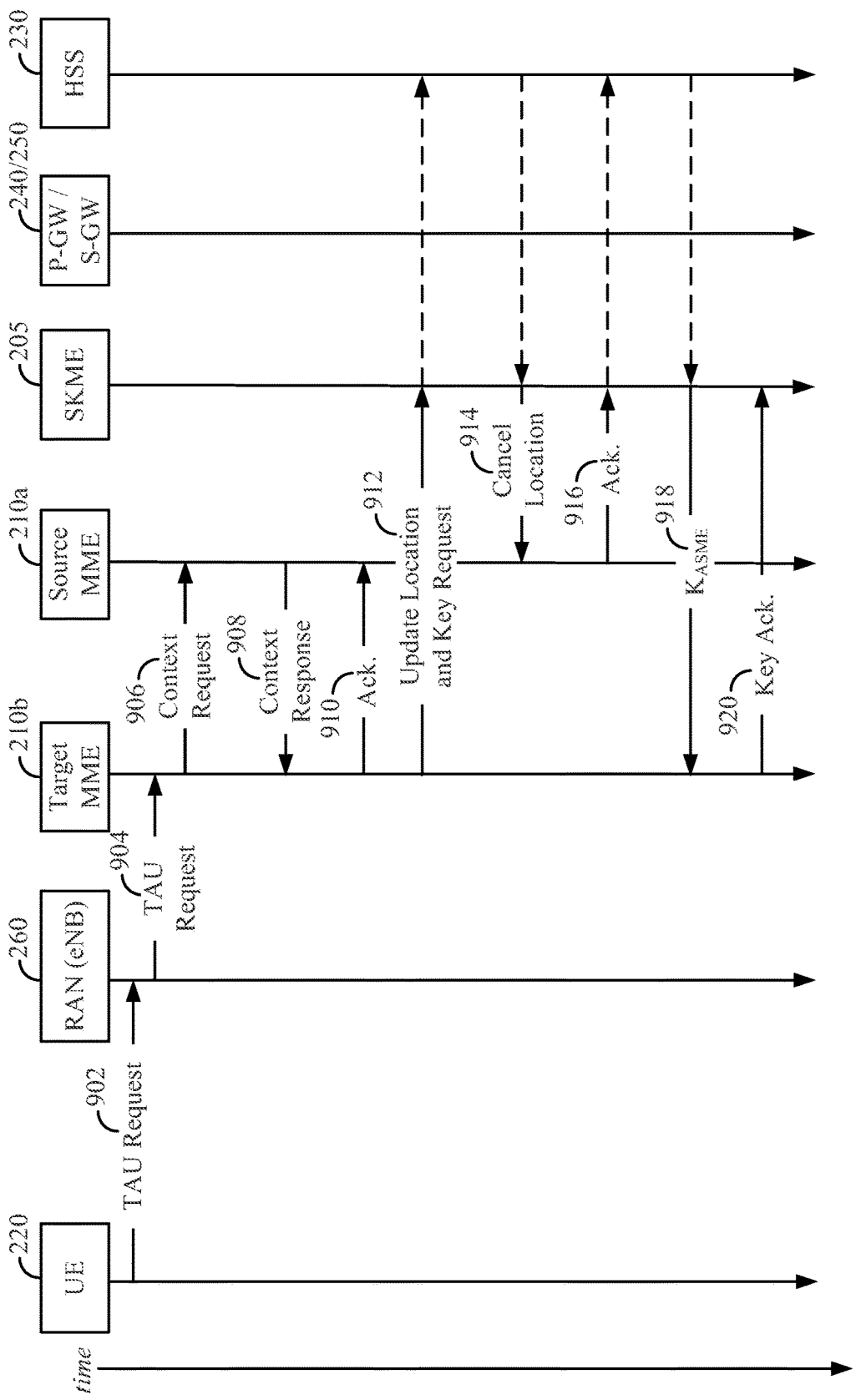
FIGS. 9A and 9B illustrate a flow diagram of a tracking area update procedure after a UE moves to a new location requiring an MME relocation.
Figure 9B:
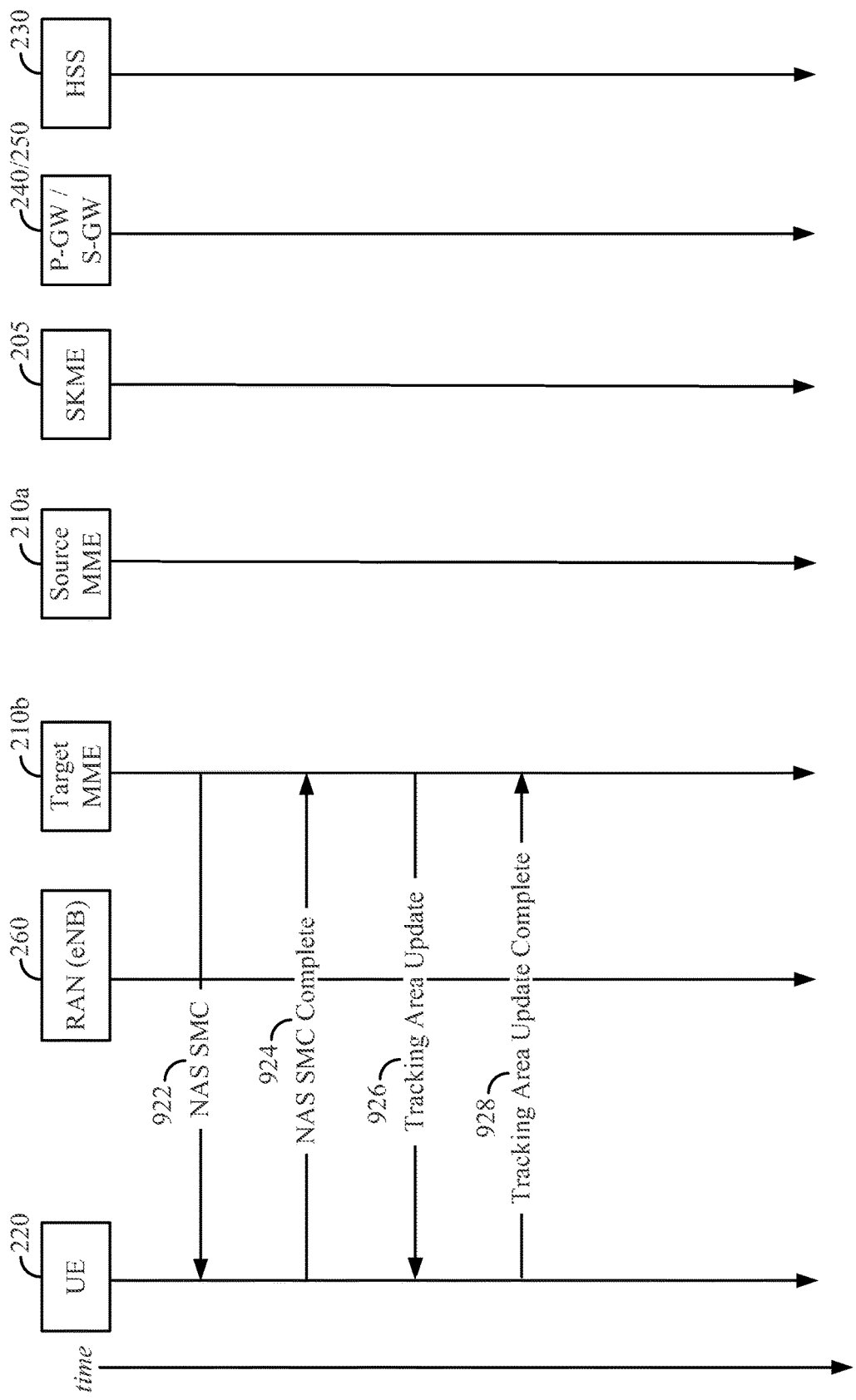

FIGS. 9A and 9B illustrate a flow diagram of a tracking area update procedure after a UE 220 moves to a new location requiring an MME relocation according to one aspect of the disclosure. Referring to FIG. 9A, first, the UE 220 generates and transmits 902 a tracking area update request to the RAN 260 (e.g., eNB). The eNB 260 in turn forwards 904 the tracking area update request to a target MME 210b (e.g., "new MME") that will be associated with and/or serve the UE 220. The eNB 260 determines which new MME 210b to send the tracking area update request to based on various criteria including the location of the UE 220. The tracking area update request may include a globally unique temporary identifier (GUTI) that includes the GUMMEI of the source MME 210a (e.g., "old MME"), which is the MME currently associated with the UE 220. The target MME 210b may then use the GUMMEI in the tracking area update request it receives to transmit 906 a UE context request message to the source MME 210a. The source MME 210a then responds 908 with the UE context information in a UE context response message. An acknowledgement may be sent 910 from the target MME 210b to the source MME 210a once this response is received.

The target MME 210b may then send 912 a location update and a key request (i.e., $K_{ASME}$ key request) to the SKME 205. The location update is forwarded to the HSS 230 which then sends 914 a location cancellation message to the source MME 210a. In response, the source MME 210a may transmit 916 a location cancellation acknowledgement message back to the HSS 230. The SKME 205 may generate a new $K_{ASME}$ for the target MME 210b based on the GUMMEI of the target MME 210b and/or the Key Count counter value as previously described. According to one aspect, a number used once (nonce) may be used instead of the Key Count. According to another aspect, the GUMMEI may be omitted if it is not desired to authorize a particular MME identity. The new $K_{ASME}$ is transmitted 918 to the target MME 210b. Upon receiving $K_{ASME}$ from the SKME 205, the target MME 210b may reply 920 with a key acknowledgement message to the SKME 205. According to one aspect, the target MME 210b may transmit 906 the UE context request message to the source MME 210a at about the same time it transmits 912 the location update and key request to the SKME 205. Thus, steps 906, 908, and 910 may be performed concurrently with steps 912, 914, 916, 918, 920.

Referring to FIG. 9B, once the target MME 210b has received the $K_{ASME}$ from the SKME 205, the target MME 210b may then perform 922, 924 a non-access stratum security mode command procedure with the UE 220. During the security mode command procedure, the UE 220 derives the key $K_{ASME}$ used by the target MME 210b since the target MME 210b provides the UE 220 with its GUMMEI. Once the UE 220 also has the same $K_{ASME}$ as the target MME 210b, the UE 220 and the target MME 210b may engage in secure communications based on the $K_{ASME}$ key. For example, the target MME 210b may engage 926, 928 in a tracking area update exchange with the UE 220 whose communications are encrypted by $K_{ASME}$ or other keys (e.g., NAS encryption and integrity protection keys) derived from $K_{ASME}$. This exchange may include a message sent from the target MME 210b to the UE 220 that includes the new GUTI based on the target MME's GUMMEI. Such a message is again encrypted by $K_{ASME}$ or another key derived from $K_{ASME}$.

As shown in FIG. 9B and described above, the NAS SMC 922, 924 is followed by the tracking area update process 926, 928. In some aspects of the disclosure, the NAS SMC 922, 924 and the tracking area update process 926, 928 may be combined. For example, the NAS SMC message 922 sent from the target MME 210b to the UE 220 may be combined with the tracking area update message 926. In so doing, only part of the combined message (e.g., the part associated with the tracking area update) may be encrypted, while the portion of the message that helps the UE derive $K_{ASME}$ is left unencrypted. A new temporary mobile subscriber identity (TMSI), which is part of GUTI, allocated by the MME may be encrypted.

Key Derivation

As discussed above, AKA is run between the UE and the SKME. The key $K_{SKME}$ is derived by the HSS and sent to the SKME. From the HSS' perspective, authentication vectors are constructed in the same manner as 4G LTE and sent to the SKME instead of the MME. Thus, HSS may be connected to SKME without any modification.

SKME derives a mobility session key $K_{ASME}$ for a given MME and thus the MME's GUMMEI may be used in the $K_{ASME}$ key derivation process. A NAS Count value may be initialized to zero (0) for a new $K_{ASME}$. In one example, the old NAS Count values are not discarded if tracking area update(s) doesn't complete. For the freshness of the key $K_{ASME}$ the UE and the SKME may maintain a Key Count counter value and use it for $K_{ASME}$ derivation. This may be done to avoid deriving the same $K_{ASME}$ in cases where the UE moves back to an old MME. The Key Count counter value may be initialized to zero (0) or some other predetermined value when the initial AKA is performed successfully. In some aspects, a nonce may be used instead of the Key Count counter value. In another aspect, the GUMMEI may be omitted from the key derivation.

The key derivation function (KDF) used to generate the keys $K_{SKME}$, $K_{ASME}$, $K_{eNB}$, next hop (NH), etc. may utilize HMAC-SHA-256, HMAC-SHA-3, etc. The input string S may be constructed from n+1 input parameters. For example, S=[FC∥P_0∥L_0∥P_1∥L_1∥P_2∥L_2∥ . . . ∥P_N∥L_N]. The field code FC may be a single octet used to distinguish between different instances of the algorithm and may use a value in the range 0x50-0x5F. The input parameters $P_0$ through $P_N$ are the n+1 input parameter encodings. $P_0$ may be a static ASCII-encoded string. The values $L_0$ through $L_N$ are two octet representations of the length of the corresponding input parameters $P_0$ through $P_N$.

$K_{SKME}$ Derivation.

$K_{SKME}$=KDF($K_{CK/IK}$, S). The input S may be equal to [FC∥P_0∥L_0∥P_1∥L_1] where FC=0x50, $P_0$=SN id, $L_0$=length of SN id (i.e., $L_0$=0x00 0x03), $P_1$=SQN XOR AK, and $L_1$=length of $P_1$ (i.e., $L_1$=0x00 0x06). SQN is the sequence number and AK is anonymity key, and XOR is the exclusive OR operation. The value SQN XOR AK is sent to the UE as part of the authentication token (AUTN). If AK is not used then AK may be treated in accordance with TS 33.102 (i.e., 000 . . . 0). The input key $K_{CK/IK}$ is the concatenation of the cipher key (CK) and the integrity key (IK), i.e., $K_{CK/IK}$=CK∥IK.

$K_{ASME}$ Derivation.

$K_{ASME}$=KDF($K_{SKME}$, S). The input S may be equal to [FC∥P_0∥L_0∥P_1∥L_1] where FC=0x51, $P_0$=GUMMEI, $L_0$=length of 48 bit GUMMEI (i.e., $L_0$=0x00 0x06), $P_1$=Key Count, and $L_1$ may equal the length of $P_1$ (e.g., $L_1$=0x00 0x08). This is merely one example of how $K_{ASME}$ may be derived. In another aspects, the GUMMEI may be omitted and rand number used once (e.g., nonce) may be used instead of the Key Count counter value.

NH Derivation.

NH=KDF($K_{ASME}$, S). The input S may be equal to [FC∥P_0∥L_0] where FC=0x52, $P_0$=Sync-Input, $L_0$=length of Sync-Input (i.e., $L_0$=0x00 0x20). The Sync-Input parameter may be newly derived $K_{eNB}$ for the initial NH derivation, and the previous NH for all subsequent derivations. This results in an NH chain, where the next NH is always fresh and derived from the previous NH.

$K_{eNB}$ Derivation.

$K'_{eNB}$=KDF($K_x$, S). When deriving $K'_{eNB}$ from the current $K_{eNB}$ or from a fresh NH and the target physical cell identifier in the UE and the eNB as specified in clause 7.2.8 for handover purposes, the input S may be equal to [FC∥P_1∥L_0∥P_1∥L_1] where FC=0x53, $P_0$=target physical cell identifier (PCI), $L_0$=length of PCI (e.g., $L_0$=0x00 0x02), $P_1$=EARFCN-DL (target physical cell downlink frequency), and $L_1$=length of $P_1$ (e.g., $L_1$=0x00 0x02). The input key $K_X$ may be the 256 bit next hop (NH) key when the index in the handover increases otherwise the current 256 bit $K_{eNB}$ is used.

FIGS. 7-9 shown and described above assume that the MMEs change from source to target MME. However, the same process flow diagrams may be used when a single MME assumes the role of two MMEs (source MME and target MME) and there is no actual interface between the two MMEs.

Figure 10:
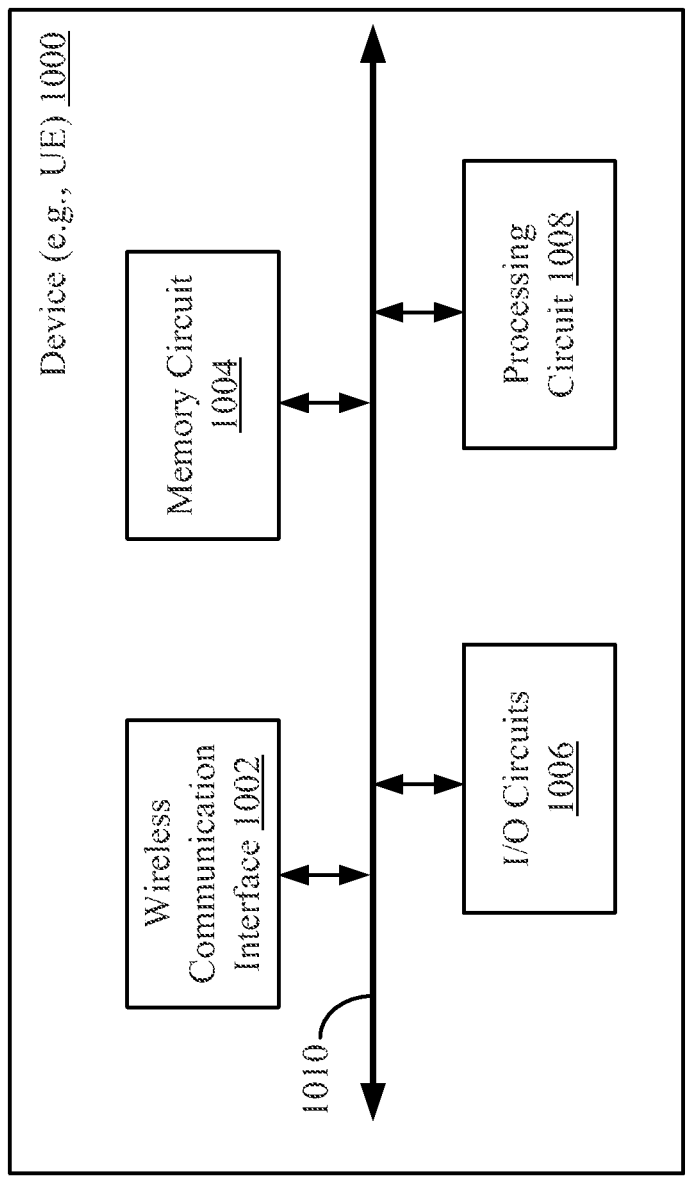
FIG. 10 illustrates a schematic block diagram of a device.

FIG. 10 illustrates a schematic block diagram of a device 1000 (e.g., "user device", "user equipment", "wireless communication device") according to one aspect of the disclosure. The device 1000 may be an integrated circuit, a plurality of integrated circuits, or an electronic device that incorporates one or more integrated circuits. The device 1000 may also be any wireless communication device such as, but not limited to, a mobile phone, a smartphone, a laptop, a personal digital assistant (PDA), a tablet, a computer, a smartwatch, and a head-mounted wearable computer (e.g., Google Glass®). The device 1000 may include at least one or more wireless communication interfaces 1002, one or more memory circuits 1004, one or more input and/or output (I/O) devices/circuits 1006, and/or one or more processing circuits 1008 that may be communicatively coupled to one another. For example, the interface 1002, the memory circuit 1004, the I/O devices 1006, and the processing circuit 1008 may be communicatively coupled to each other through a bus 1010. The wireless communication interface 1002 allows the device 1000 to communicate wirelessly with the wireless communication network 104. Thus, the interface 1002 allows the device 1000 to communicate wirelessly with wireless wide area networks (WWAN), such as mobile telecommunication cellular networks, as well as short range, wireless local area networks (e.g., WiFi®, Zigbee®, Bluetooth®, etc.).

The memory circuit 1004 may include one or more volatile memory circuits and/or non-volatile memory circuits. Thus, the memory circuit 1004 may include dynamic random access memory (DRAM), static random access memory (SRAM), magnetoresistive random access memory (MRAM), electrically erasable programmable read-only memory (EEPROM), flash memory, etc. The memory circuit 1004 may store one or more cryptographic keys. The memory circuit 1004 may also store instructions that may be executed by the processing circuit 1008. The I/O devices/circuits 1006 may include one or more keyboards, mice, displays, touchscreen displays, printers, fingerprint scanners, and any other input and/or output devices.

The processing circuit 1008 (e.g., processor, central processing unit (CPU), application processing unit (APU), etc.) may execute instructions stored at the memory circuit 1006 and/or instructions stored at another computer-readable storage medium (e.g., hard disk drive, optical disk drive, solid-state drive, etc.) communicatively coupled to the user device 1000. The processing circuit 1008 may perform any one of the steps and/or processes of the device 1000 described herein including those discussed with reference to FIGS. 3A, 3B, 6 7, 8, 9A, 9B, and/or 12. According to one aspect, the processing circuit 1008 may be a general purpose processor. According to another aspect, the processing circuit may be hard-wired (e.g., it may be an application-specific integrated circuit (ASIC)) to perform the steps and/or processes of the UE 220 described herein including those discussed with reference to FIGS. 3A, 3B, 6 7, 8, 9A, 9B, and/or 12.

Figure 11:
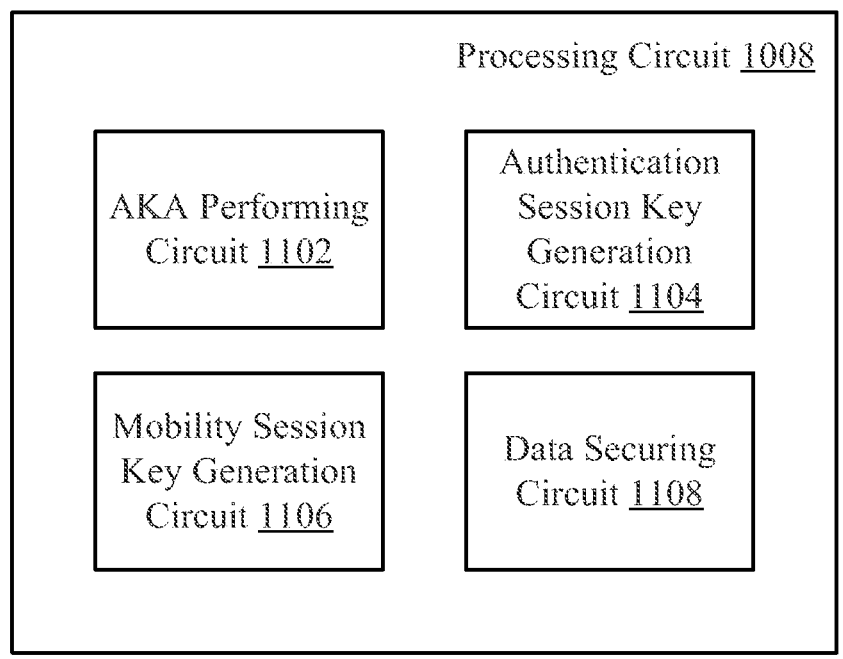
FIG. 11 illustrates a schematic block diagram of a device processing circuit.

FIG. 11 illustrates a schematic block diagram of a device processing circuit 1008 according to one aspect. The processing circuit 1008 may include an authorization and key agreement (AKA) performing circuit 1102, an authentication session key generation circuit 1104, a mobility session key generation circuit 1106, and/or a data securing circuit 1108. According to one aspect, these circuits 1102, 1104, 1106, 1108 may be ASICs and are hard-wired to perform their respective processes.

The AKA performing circuit 1102 may be one non-limiting example of a means for performing authentication and key agreement with an SKME device. The authentication session key generation circuit 1104 may be one non-limiting example of a means for generating an authentication session key based in part on a secret key shared with a home subscriber server. The mobility session key generation circuit 1106 may be one non-limiting example of a means for generating a mobility session key based in part on the authentication session key. The data securing circuit 1108 may be one non-limiting example of a means for cryptographically securing data sent from the device to a wireless communication network using the mobility session key.

Figure 12:
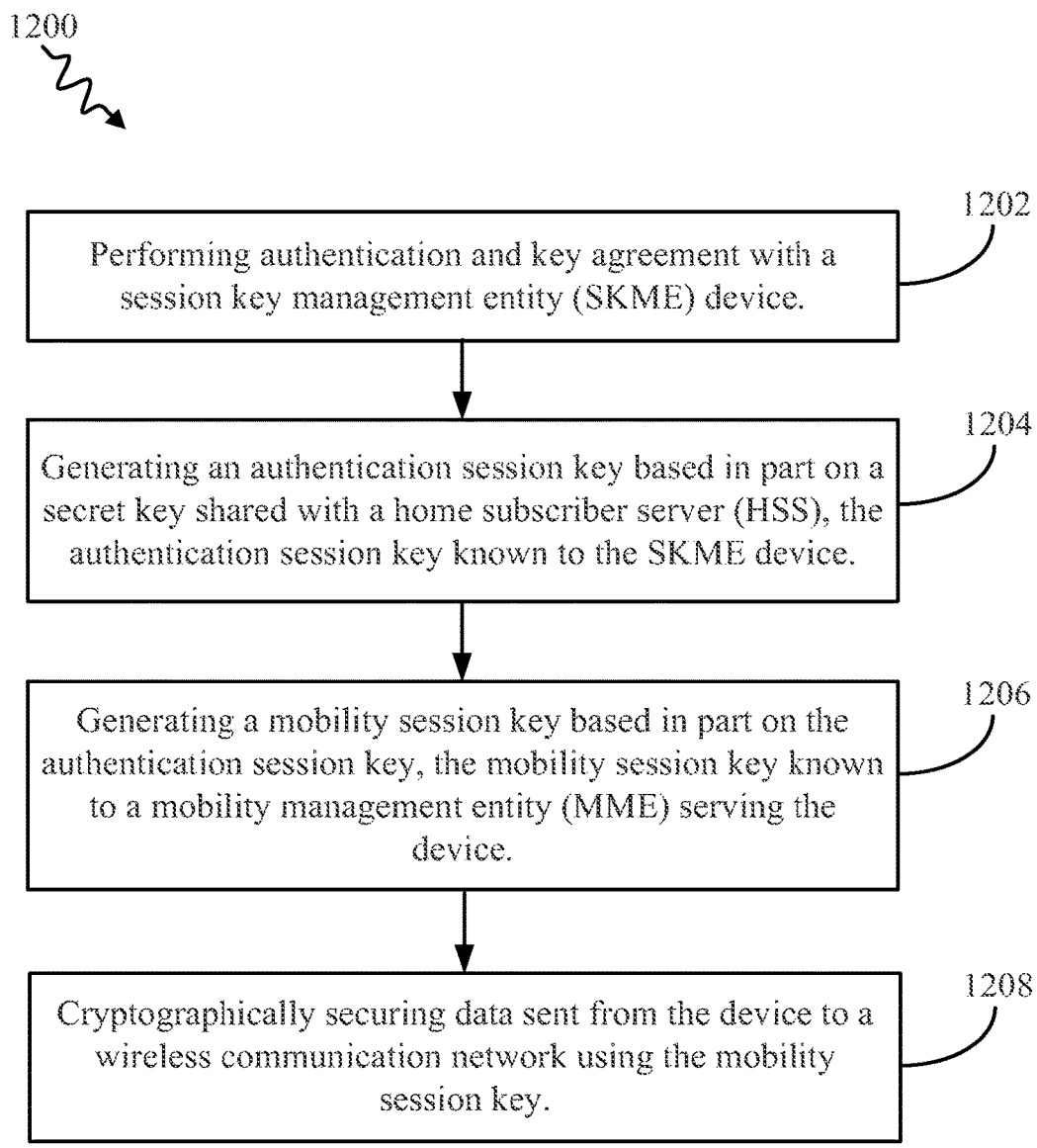
FIG. 12 illustrates a method operational at a device.

FIG. 12 illustrates a method 1200 operational at the device 1000. First, authentication and key agreement with a session key management entity (SKME) device is performed 1202. Next, an authentication session key is generated 1204 based in part on a secret key shared with a home subscriber server (HSS), the authentication session key known to the SKME device. Then, a mobility session key is generated 1206 based in part on the authentication session key, the mobility session key known to a mobility management entity (MME) serving the device. Next, data sent from the device to a wireless communication network is cryptographically secured 1208 using the mobility session key.

Figure 13:
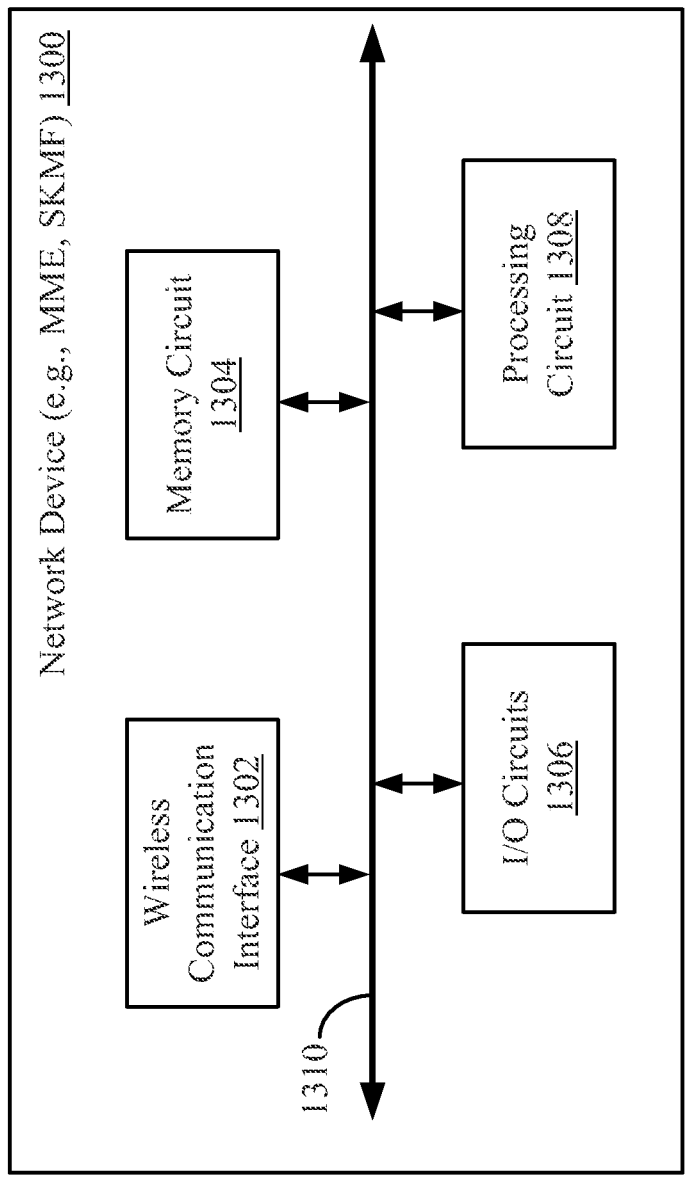
FIG. 13 illustrates a schematic block diagram of a network device.

FIG. 13 illustrates a schematic block diagram of a network device 1300 according to one aspect of the disclosure. The network device 1300 may be, among other network components, an SKME, MME, a RAN, S-GW, and/or P-GW. The network device 1300 may include at least one or more wireless communication interfaces 1302, one or more memory circuits 1304, one or more input and/or output (I/O) devices/circuits 1306, and/or one or more processing circuits 1308 that may be communicatively coupled to one another. For example, the interface 1302, the memory circuit 1304, the I/O devices 1306, and the processing circuit 1308 may be communicatively coupled to each other through a bus 1310. The wireless communication interface 1302 allows the network device 1300 to communicate wirelessly with the user device 102. Thus, the interface 1302 allows the network device 1300 to communicate wirelessly through wireless wide area networks (WWAN), such as mobile telecommunication cellular networks, and/or short range, wireless local area networks (e.g., WiFi®, Zigbee®, Bluetooth®, etc.).

The memory circuit 1304 may include one or more volatile memory circuits and/or non-volatile memory circuits. Thus, the memory circuit 1304 may include DRAM, SRAM, MRAM, EEPROM, flash memory, etc. The memory circuit 1304 may store one or more cryptographic keys. The memory circuit 1304 may also store instructions that may be executed by the processing circuit 1308. The I/O devices/circuits 1306 may include one or more keyboards, mice, displays, touchscreen displays, printers, fingerprint scanners, and any other input and/or output devices.

The processing circuit 1308 (e.g., processor, central processing unit (CPU), application processing unit (APU), etc.) may execute instructions stored at the memory circuit 1306 and/or instructions stored at another computer-readable storage medium (e.g., hard disk drive, optical disk drive, solid-state drive, etc.) communicatively coupled to the network device 1300. The processing circuit 1308 may perform any one of the steps and/or processes of a network devices described herein including those discussed with reference to FIGS. 3A, 3B, 6, 7, 8, 9A, 9B, 16, and/or 17. According to one aspect, the processing circuit 1308 may be a general purpose processor. According to another aspect, the processing circuit 1308 may be hard-wired (e.g., it may be an application-specific integrated circuit (ASIC)) to perform the steps and/or processes of the SKME 205 and/or MME 210, 210a, 210b described herein including those discussed with reference to FIGS. 3A, 3B, 6, 7, 8, 9A, 9B, 16, and/or 17.

Figure 14:
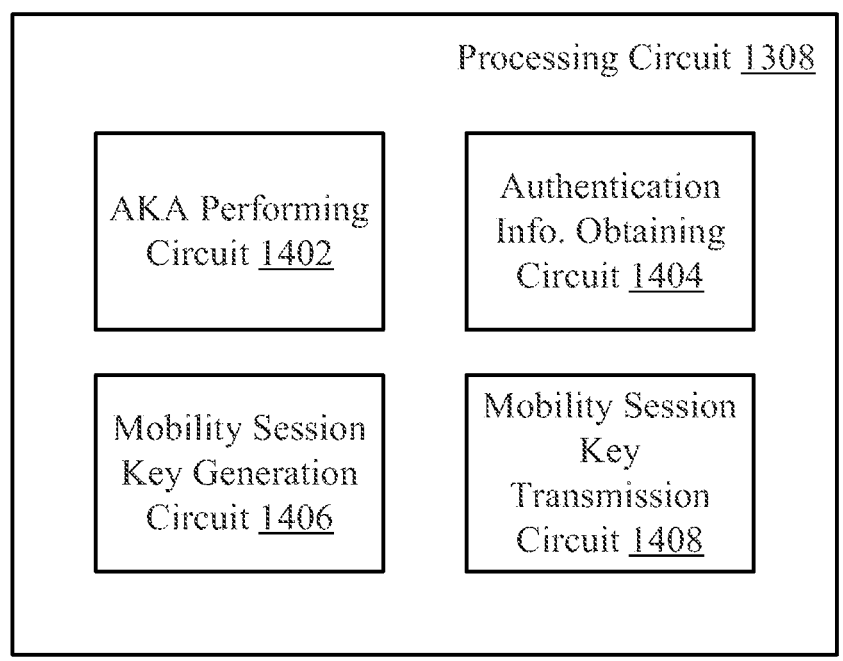
FIG. 14 illustrates a first exemplary schematic block diagram of a network device processing circuit.

FIG. 14 illustrates a schematic block diagram of a network device processing circuit 1308 according to one aspect. The processing circuit 1308 may include an authorization and key agreement (AKA) performing circuit 1402, an authentication information obtaining circuit 1404, a mobility session key generation circuit 1406, and/or a mobility session key transmission circuit 1408. According to one aspect, these circuits 1402, 1404, 1406, 1408 may be ASICs and are hard-wired to perform their respective processes.

The AKA performing circuit 1402 may be one non-limiting example of a means for performing authentication and key agreement with a device. The authentication information obtaining circuit 1404 may be one non-limiting example of a means for obtaining authentication information associated with the device, the authentication information including at least an authentication session key. The mobility session key generation circuit 1406 may be one non-limiting example of a means for generating a mobility session key based in part on the authentication session key. The mobility session key transmission circuit 1408 may be one non-limiting example of a means for transmitting the mobility session key to a mobility management entity (MME) serving the device.

Figure 15:
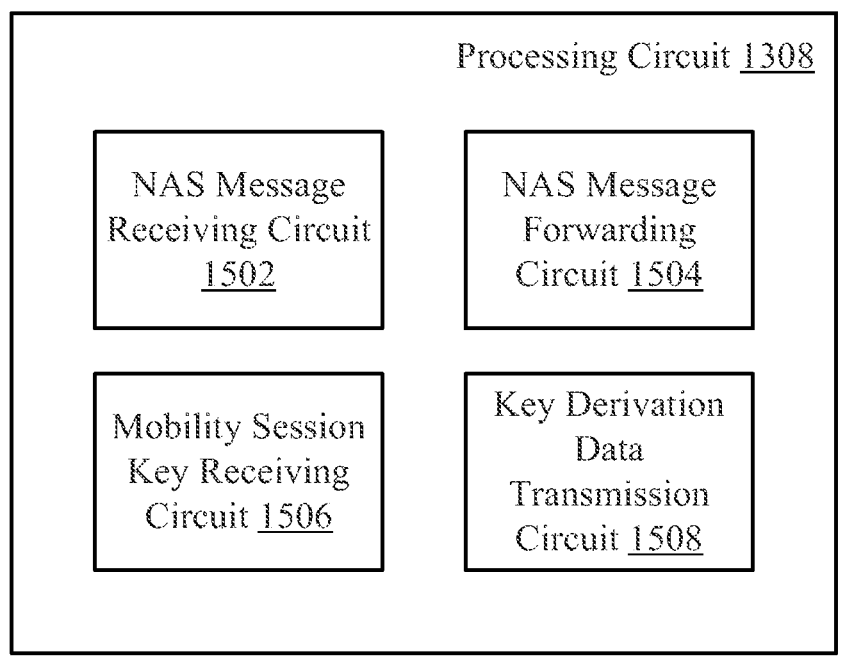
FIG. 15 illustrates a second exemplary schematic block diagram of a network device processing circuit.

FIG. 15 illustrates a schematic block diagram of a network device processing circuit 1308 according to another aspect. The processing circuit 1308 may include a NAS message receiving circuit 1502, a NAS message forwarding circuit 1504, a mobility session key receiving circuit 1506, and/or a key derivation data transmission circuit 1508. According to one aspect, these circuits 1502, 1504, 1506, 1508 may be ASICs and are hard-wired to perform their respective processes.

The NAS message receiving circuit 1502 may be one non-limiting example of a means for receiving a non-access stratum (NAS) message from a device. The NAS message forwarding circuit 1504 may be one non-limiting example of a means for forwarding the NAS message along with a network device identification value identifying the network device to a session key management entity (SKME) device. The mobility session key receiving circuit 1506 may be one non-limiting example of a means for receiving a mobility session key from the SKME device, the mobility session key based in part on an authentication session key that was derived from a key shared between the device and a wireless communication network. The key derivation data transmission circuit 1508 may be one non-limiting example of a means for transmitting key derivation data to the device, the key derivation data enabling the device to derive the mobility session key.

Figure 16:
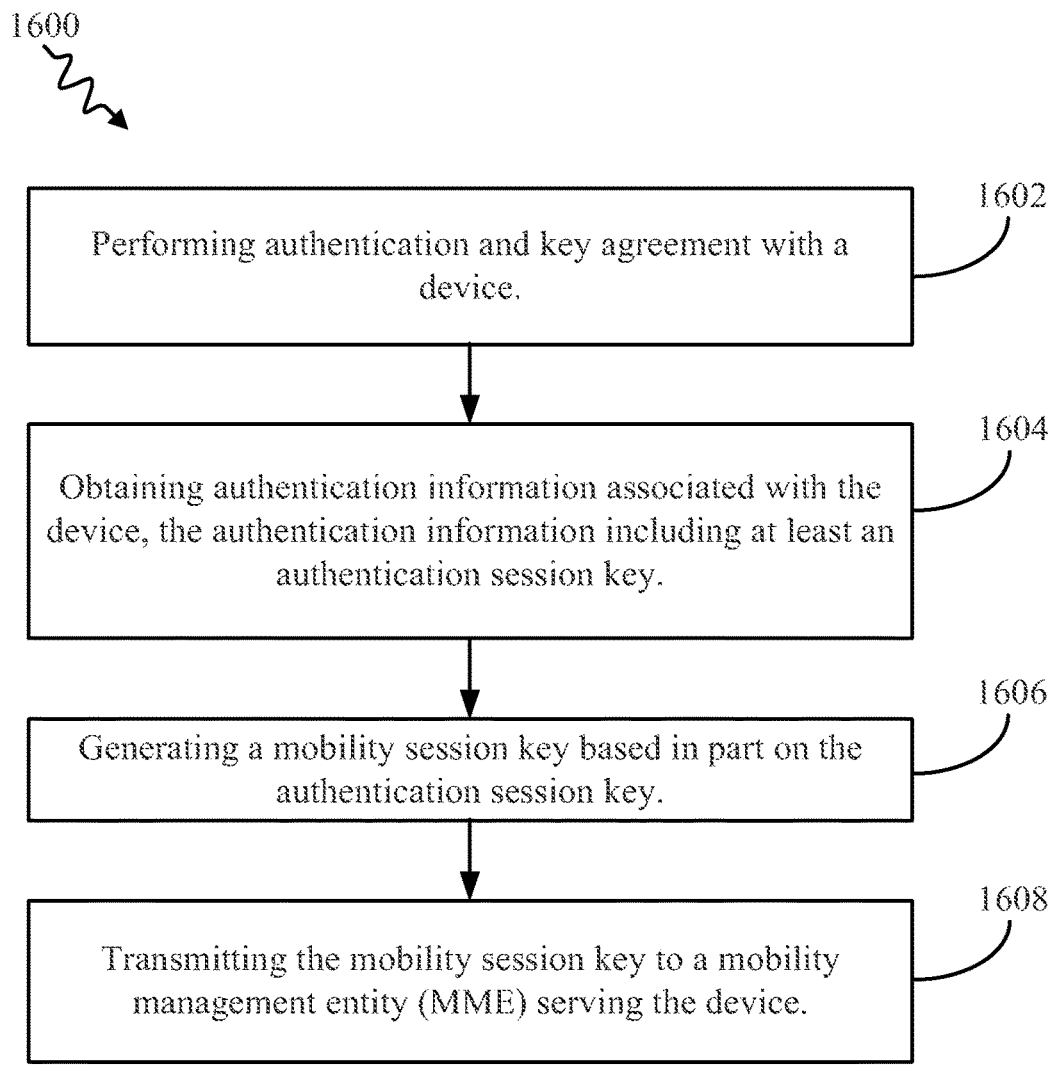
FIG. 16 illustrates a first exemplary method operational at a network device.

FIG. 16 illustrates a method 1600 operational at the network device 1300. First, authentication and key agreement with a device is performed 1602. Next, authentication information associated with the device is obtained 1604, the authentication information including at least an authentication session key. Then, a mobility session key based in part on the authentication session key is generated 1606. Next, the mobility session key is transmitted 1608 to a mobility management entity (MME) serving the device.

Figure 17:
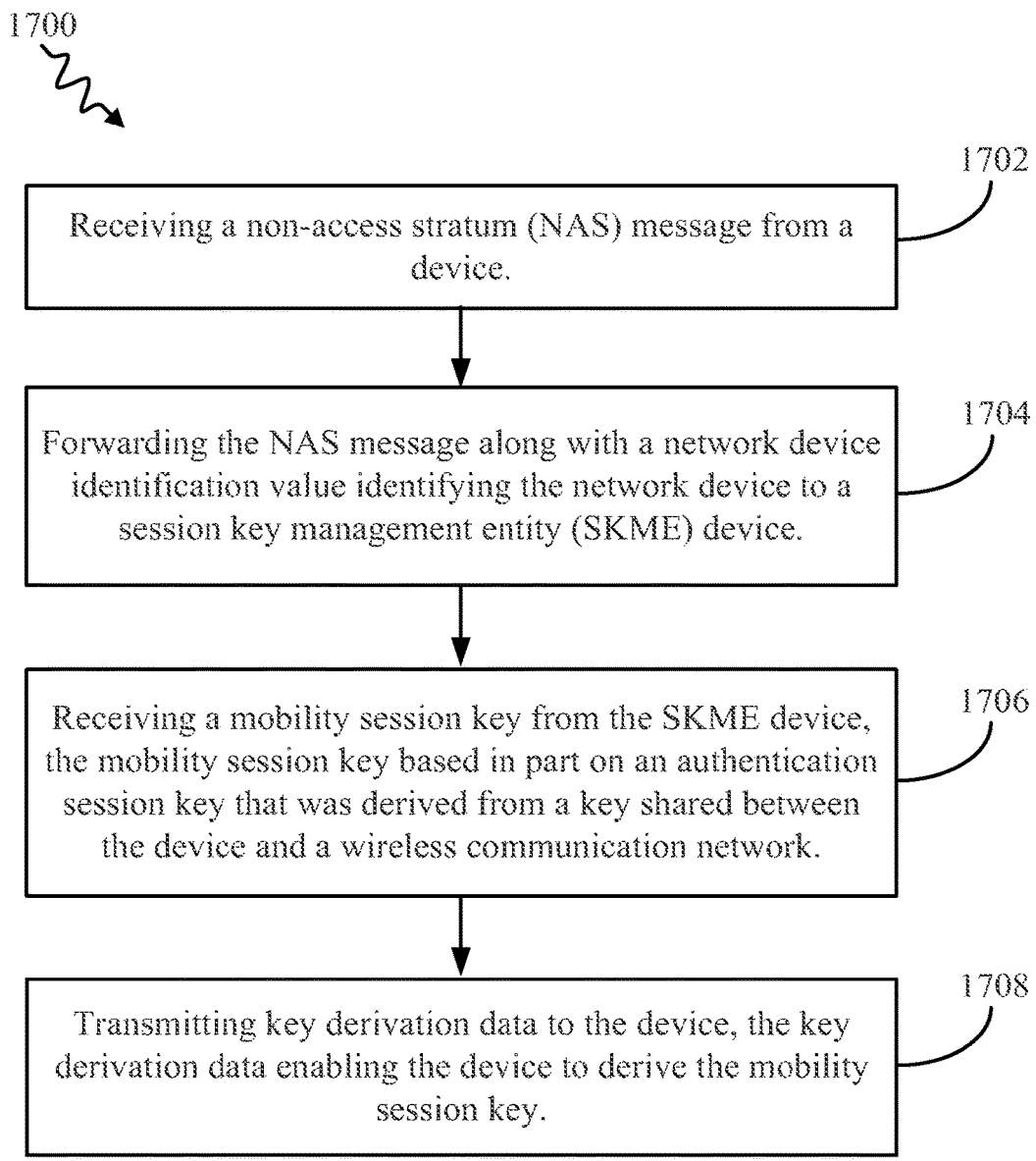
FIG. 17 illustrates a second exemplary method operational at a network device.

FIG. 17 illustrates a method 1700 operational at the network device 1300. First, a non-access stratum (NAS) message is received 1702 from a device. Next, the NAS message along with a network device identification value identifying the network device is forwarded 1704 to a session key management entity (SKME) device. Then, a mobility session key from the SKME device is received 1706, the mobility session key based in part on an authentication session key that was derived from a key shared between the device and a wireless communication network. Next, key derivation data is transmitted 1708 to the device, the key derivation data enabling the device to derive the mobility session key.

One or more of the components, steps, features, and/or functions illustrated in FIGS. 2, 3A, 3B, 4, 5, 6, 7, 8, 9A, 9B, 10, 11, 12, 13, 14, 15, 16, and/or 17 may be rearranged and/or combined into a single component, step, feature or function or embodied in several components, steps, or functions. Additional elements, components, steps, and/or functions may also be added without departing from the invention. The apparatus, devices, and/or components illustrated in FIGS. 2, 3A, 3B, 4, 5, 7, 8, 9A, 9B, 10, 11, 13, 14, and/or 15 may be configured to perform one or more of the methods, features, or steps described in FIGS. 2, 3A, 3B, 6, 7, 8, 9A, 9B, 12, 16, and/or 17. The algorithms described herein may also be efficiently implemented in software and/or embedded in hardware Also, it is noted that the aspects of the present disclosure may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Moreover, a storage medium may represent one or more devices for storing data, including read-only memory (ROM), random access memory (RAM), magnetic disk storage mediums, optical storage mediums, flash memory devices and/or other machine-readable mediums and, processor-readable mediums, and/or computer-readable mediums for storing information. The terms "machine-readable medium", "computer-readable medium", and/or "processor-readable medium" may include, but are not limited to non-transitory mediums such as portable or fixed storage devices, optical storage devices, and various other mediums capable of storing or containing instruction(s) and/or data. Thus, the various methods described herein may be fully or partially implemented by instructions and/or data that may be stored in a "machine-readable medium", "computer-readable medium", and/or "processor-readable medium" and executed by one or more processors, machines and/or devices.

Furthermore, aspects of the disclosure may be implemented by hardware, software, firmware, middleware, microcode, or any combination thereof. When implemented in software, firmware, middleware or microcode, the program code or code segments to perform the necessary tasks may be stored in a machine-readable medium such as a storage medium or other storage(s). A processor may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The various illustrative logical blocks, modules, circuits, elements, and/or components described in connection with the examples disclosed herein may be implemented or performed with a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing components, e.g., a combination of a DSP and a microprocessor, a number of microprocessors, one or more microprocessors in conjunction with a DSP core, or any other such configuration.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

Those of skill in the art would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system.

The various features of the invention described herein can be implemented in different systems without departing from the invention. It should be noted that the foregoing aspects of the disclosure are merely examples and are not to be construed as limiting the invention. The description of the aspects of the present disclosure is intended to be illustrative, and not to limit the scope of the claims. As such, the present teachings can be readily applied to other types of apparatuses and many alternatives, modifications, and variations will be apparent to those skilled in the art.

What is claimed is:

1. A method operational at a device, the method comprising:
    wirelessly transmitting a non-access stratum (NAS) message to a radio access node, wherein the NAS message propagates to a mobility management entity (MME) and then to a separate core network device serving the MME;
    obtaining an authentication session key that is based in part on a secret key known by a home subscriber server (HSS) configured to serve the core network device, the authentication session key known to the core network device, wherein the secret key is derived from a root key known by the device and an authentication center;
    obtaining a mobility session key that is based in part on the authentication session key, the mobility session key known to a mobility management entity (MME) served by the core network device and serving the device; and
    cryptographically securing data sent from the device to a wireless communication network based on the mobility session key.

2. The method of claim 1, further comprising:
    obtaining different mobility session keys for different MMEs wherein the different mobility session keys are based in part on the authentication session key.

3. The method of claim 1, further comprising:
    receiving key derivation data from the MME after successfully performing key agreement with the core network device, the key derivation data enabling the device to derive the mobility session key.

4. The method of claim 3, wherein the key derivation data includes an MME identification value identifying the MME serving the device, and the method further comprises:
    obtaining the mobility session key based further in part on the MME identification value.

5. The method of claim 4, wherein the MME identification value is a globally unique MME identifier (GUMMEI).

6. The method of claim 4, wherein the MME identification value is an MME group identifier (MMEGI).

7. The method of claim 1, wherein the core network device is an authentication session key anchor function device.

8. The method of claim 1, wherein the root key, an integrity key, and a cipher key are shared secret keys shared between the device and the core network, and wherein the integrity key and the cipher key are derived from the root key.

9. The method of claim 1, wherein obtaining the mobility session key includes deriving the mobility session key using a key derivation function having as inputs the authentication session key and at least one of an MME identification value uniquely identifying the MME, and a counter value Key Count.

10. The method of claim 1, further comprising:
    receiving notification of MME relocation wherein the notification comprises an MME identifier uniquely identifying a second MME attempting to serve the device;
    obtaining a second mobility session key wherein the second mobility session key is based in part on the authentication session key and the MME identifier uniquely identifying the second MME.

11. The method of claim 1, further comprising:
    deriving a node B key that is based in part on the mobility session key; and
    encrypting data transmitted to a radio access node serving the device using the node B key.

12. A device comprising:
    a wireless communication interface configured to send and receive data to and from a wireless communication network; and
    a processing circuit communicatively coupled to the wireless communication interface, the processing circuit configured to:
    wirelessly transmit a non-access stratum (NAS) message to a radio access node wherein the NAS message is passed to a mobility management entity (MME) and then to a core network device serving the MME wherein the core network device is a key anchor;
    obtain an authentication session key that is based in part on a secret key known by a home subscriber server (HSS) configured to serve the core network device, the authentication session key known to the core network device, wherein the secret key is derived from a root key known by the device and an authentication center;
    obtain a mobility session key that is based in part on the authentication session key, the mobility session key known to a mobility management entity (MME) served by the core network device and serving the device; and
    cryptographically secure data sent from the device to the wireless communication network based on the mobility session key.

13. The device of claim 12, wherein the processing circuit is further configured to:

obtain different mobility session keys for different MMEs wherein the different mobility session keys are based in part on the authentication session key.

14. The device of claim 12, wherein the processing circuit is further configured to:
receive key derivation data from the MME after successfully performing key agreement with the core network device, the key derivation data enabling the device to derive the mobility session key.

15. The device of claim 14, wherein the key derivation data includes an MME identification value identifying the MME serving the device, and the processing circuit is further configured to:
obtain the mobility session key based further in part on the MME identification value.

16. The device of claim 12, wherein obtain the mobility session key includes having the processing circuit further configured to derive the mobility session key using a key derivation function having the authentication session key, an MME identification value uniquely identifying the MME, and a number used once (nonce) as inputs.

17. The device of claim 12, wherein the processing circuit is further configured to:
receive notification of MME relocation wherein the notification comprises an MME identifier uniquely identifying a second MME attempting to serve the device;
obtain a second mobility session key that is based in part on the authentication session key and the MME identifier uniquely identifying the second MME.

18. A device comprising:
means for wirelessly transmitting a non-access stratum (NAS) message to a radio access node wherein the NAS message is passed to a mobility management entity (MME) and then to a core network device serving the MME wherein the core network device is a key anchor;
means for obtaining an authentication session key that is based in part on a secret key known by a home subscriber server (HSS) configured to serve the core network device, the authentication session key known to the core network device, wherein the secret key is derived from a root key known by the device and an authentication center;
means for obtaining a mobility session key that is based in part on the authentication key, the mobility session key known to a mobility management entity (MME) served by the core network device and serving the device; and
means for cryptographically securing data sent from the device to a wireless communication network based on the mobility session key.

19. The device of claim 18, further comprising:
means for generating different mobility session keys for different MMEs wherein the different mobility session keys are based in part on the authentication session key.

20. A non-transitory computer-readable storage medium having instructions stored thereon that are operational at a device, the instructions when executed by at least one processor causes the processor to:
wirelessly transmit a non-access stratum (NAS) message to a radio access node wherein the NAS message is passed to a mobility management entity (MME) and then to a core network device serving the MME, wherein the core network device is a key anchor;
obtain an authentication session key that is based in part on a secret key known by a home subscriber server (HSS) configured to serve the core network device, the authentication session key known to the core network device, wherein the secret key is derived from a root key known by the device and an authentication center;
obtain a mobility session key that is based in part on the authentication session key, the mobility session key known to a mobility management entity (MME) served by the core network device and serving the device; and
cryptographically securing data sent from the device to a wireless communication network based on the mobility session key.

21. The non-transitory computer-readable storage medium of claim 20, wherein the instructions when executed by the processor further causes the processor to:
obtain different mobility session keys for different MMEs wherein the different mobility session keys are based in part on the authentication session key.

22. The method of claim 1, further comprising:
performing key agreement with the core network device.

* * * * *